(12) United States Patent
Queen

(10) Patent No.: US 11,248,390 B1
(45) Date of Patent: Feb. 15, 2022

(54) LIGHT-WEIGHT, HIGH STRENGTH, POLYMER CONCRETE SUPPORT BLOCKS, AND SYSTEMS INCORPORATING SAME

(71) Applicant: Foundation Technologies, Inc., Lawrenceville, GA (US)

(72) Inventor: Frank A. Queen, Decatur, GA (US)

(73) Assignee: Foundation Technologies, Inc., Lawrenceville, GA (US)

( * ) Notice: Subject to any disclaimer, the term of this patent is extended or adjusted under 35 U.S.C. 154(b) by 0 days.

(21) Appl. No.: 16/418,702

(22) Filed: May 21, 2019

Related U.S. Application Data

(60) Provisional application No. 62/674,055, filed on May 21, 2018.

(51) Int. Cl.
*E04H 12/22* (2006.01)
*B28B 1/14* (2006.01)
*E02D 27/42* (2006.01)

(52) U.S. Cl.
CPC .......... *E04H 12/2238* (2013.01); *B28B 1/14* (2013.01); *E02D 27/42* (2013.01); *E02D 2200/1692* (2013.01); *E02D 2250/0007* (2013.01)

(58) Field of Classification Search
CPC ....... E04H 12/2238; B28B 1/14; E02D 27/42; E02D 2250/007; E02D 2200/1692
USPC .......................................................... 52/292
See application file for complete search history.

(56) References Cited

U.S. PATENT DOCUMENTS

| | | | | |
|---|---|---|---|---|
| 5,143,780 A | * | 9/1992 | Balassa | A01N 25/10 |
| | | | | 106/731 |
| 5,363,610 A | * | 11/1994 | Thomas | E04H 9/021 |
| | | | | 52/167.8 |
| 6,345,474 B1 | * | 2/2002 | Triplett | E02D 27/01 |
| | | | | 405/229 |
| 7,694,487 B1 | * | 4/2010 | Ryan | E02D 27/42 |
| | | | | 52/741.15 |
| 8,272,812 B2 | * | 9/2012 | Woolbright | E02D 17/20 |
| | | | | 405/284 |
| 2011/0047898 A1 | * | 3/2011 | Hudgins | E04B 7/12 |
| | | | | 52/169.9 |
| 2013/0284069 A1 | * | 10/2013 | Dubey | C04B 28/18 |
| | | | | 106/695 |
| 2018/0155248 A1 | * | 6/2018 | McCandlish | C04B 20/12 |

FOREIGN PATENT DOCUMENTS

DE          3336655 A1 *  4/1985  ............. E02D 27/42

* cited by examiner

*Primary Examiner* — Patrick J Maestri
(74) *Attorney, Agent, or Firm* — Thomas | Horstemeyer, LLP

(57) ABSTRACT

The present disclosure relates to support blocks that can be used for decks and foundations fabricated from polymer concrete. Yet further, the present disclosure relates to deck, floor, and foundation systems comprising the disclosed support blocks. The support blocks can mate with or otherwise serve as foundation elements for use in conjunction with construction elements such as posts, joists, stringers, mounting frames, and equipment, among other things.

18 Claims, 21 Drawing Sheets

LIGHT-WEIGHT, HIGH STRENGTH, POLYMER CONCRETE SUPPORT BLOCKS, AND SYSTEMS INCORPORATING SAME

CROSS-REFERENCE TO RELATED APPLICATIONS

This application claims priority to, and the benefit of, U.S. Provisional Patent Application No. 62/674,055, filed May 21, 2018, the disclosure of which is hereby incorporated by reference in its entirety.

BACKGROUND

Decks are a common architectural and functional feature in residential and commercial structures. Typically, the deck is structurally supported on piers or footings that are typically fixed in the ground or, in some situations, positioned on the surface. As would be recognized, local government codes and engineers dictate the depth that the footings must be placed in the ground. The depth at which a deck footing is required to be set in the ground will vary from region to region across the country due to differing climate conditions. In warm climates like South Florida where frost rarely ever occurs, footings might be placed on grade, but in very cold regions like Minnesota and Canada footings will have to be set at greater depths due to frost heave.

Beside the need to deeply seat the footings into the ground in frost-prone areas, problems can occur when the bottom portion of the deck or other structure is rigidly attached to the footings, such as for example, when an intermediary post bracket is embedded into the footing material, usually concrete, and the top ends of posts are securely attached to the underside of beams in the overlying construction. In this typical configuration, movement of a portion or all of the deck or structure can occur as the soil expands or contracts annually as a result of frost or imposition of loads on an individual footing where the load exceeds the load bearing capacity of the soil. Independent movement of each footing can generate forces to one or more points of attachment in the deck or foundation support structure. Such movement will often be unevenly distributed, and damage or failure of the deck or structure can occur. Seismic activity can also result in uneven force being applied to the various areas of a deck. If the deck or structure is attached to a building, as is common, the building can be damaged, also. This also holds true for expansive clays due to the shrinking and swelling due to the moisture content of the soil.

SUMMARY OF THE DISCLOSURE

Aspects of the present disclosure are related to polymer concrete support blocks, and systems and applications utilizing such support blocks. In one aspect, among others, a polymer concrete support block, comprises a planar base plate; and one or more construction element support features integral to a first side of the base plate, wherein the base plate and the one or more construction element support features are fabricated from polymer concrete prepared from a mixture of monomers, aggregates, and optionally, fibers. The polymer concrete support block can be generated by curing the mixture in a mold configured to generate the planar base plate and the one or more construction element support features. In various aspects, at least about 60% of a total strength of the polymer concrete support block can be generated in about 48 hours or fewer after start of a curing operation, wherein the curing operation commences when the mixture is incorporated into a mold configured to generate the support block. The polymer concrete support block can have a water absorption rate of less than 1% according to ASTM D570 (2018).

The polymer concrete support block can include a support wall comprising a base pocket cavity configured to align with an end of at least one construction element. The one or more construction element support features can comprise first and second edge pocket notches in a support wall, the first and second edge pocket notches defined by a supporting edge and alignment edges on opposite sides of the supporting edge, the first and second edge pocket notches located on opposite sides of the base pocket cavity and configured to, in use, align with and constrain an edge of a construction element extending across the base pocket cavity and substantially parallel with the planar base plate; and first and second alignment grooves aligned on opposite sides of the base pocket cavity for alignment of the first and second edge pocket notches, the first and second alignment grooves extending from the supporting edge of the first and second edge pocket notches to a bottom surface of the base pocket cavity. The first and second edge pocket notches can be centered in opposite portions of the support wall, and the first and second alignment grooves can be centered in the supporting edge of the first and second edge pocket notches.

The planar base plate can be substantially square. The at least one construction element support feature can be substantially centered on the planar base plate. The planar base plate can be circular, and a hole can extend from the bottom surface of the base pocket cavity through the center of the planar base plate. The at least one construction feature support element can be sized to receive first and second construction elements, and first and second construction elements have different sizes. The support block can optionally comprise one or more cutouts in the planar base, thereby providing one or more portions of the planar base having void areas. A profile of the planar base plate and at least one construction element support feature can be less than 4 inches. The one or more construction element support features can comprise third and fourth edge pocket notches centered in opposite portions of the support wall and are substantially perpendicular to the first and second edge pocket notches, and third and fourth alignment grooves centered in a supporting edge of the third and fourth edge pocket notches. Gussets can extend radially outward from corners of the one or more construction element support features. Another aspect includes a mold configured to generate the polymer concrete support block.

In other aspects, a method of making a polymer concrete support block comprises preparing a mixture of monomers, aggregates, and, optionally, fibers; incorporating the mixture into a mold configured to generate the support wall and the at least one construction element support features; and removing a polymer concrete support block from the mold when the support block is at least partially cured. At least about 60% of a total strength of the support block can be generated in about 48 hours or fewer after start of a curing operation, wherein the curing operation commences when the mixture is incorporated into a mold configured to generate the support block. The fully cured polymer concrete support block can have a water absorption rate of less than 1% according to ASTM D570 (2018). The cured support block can comprise a planar base plate; and one or more construction element support features integral to a first side of the base plate, wherein the construction element support features transfer load throughout the planar base plate.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

DETAILED DESCRIPTION OF THE DISCLOSURE

Figure 1:
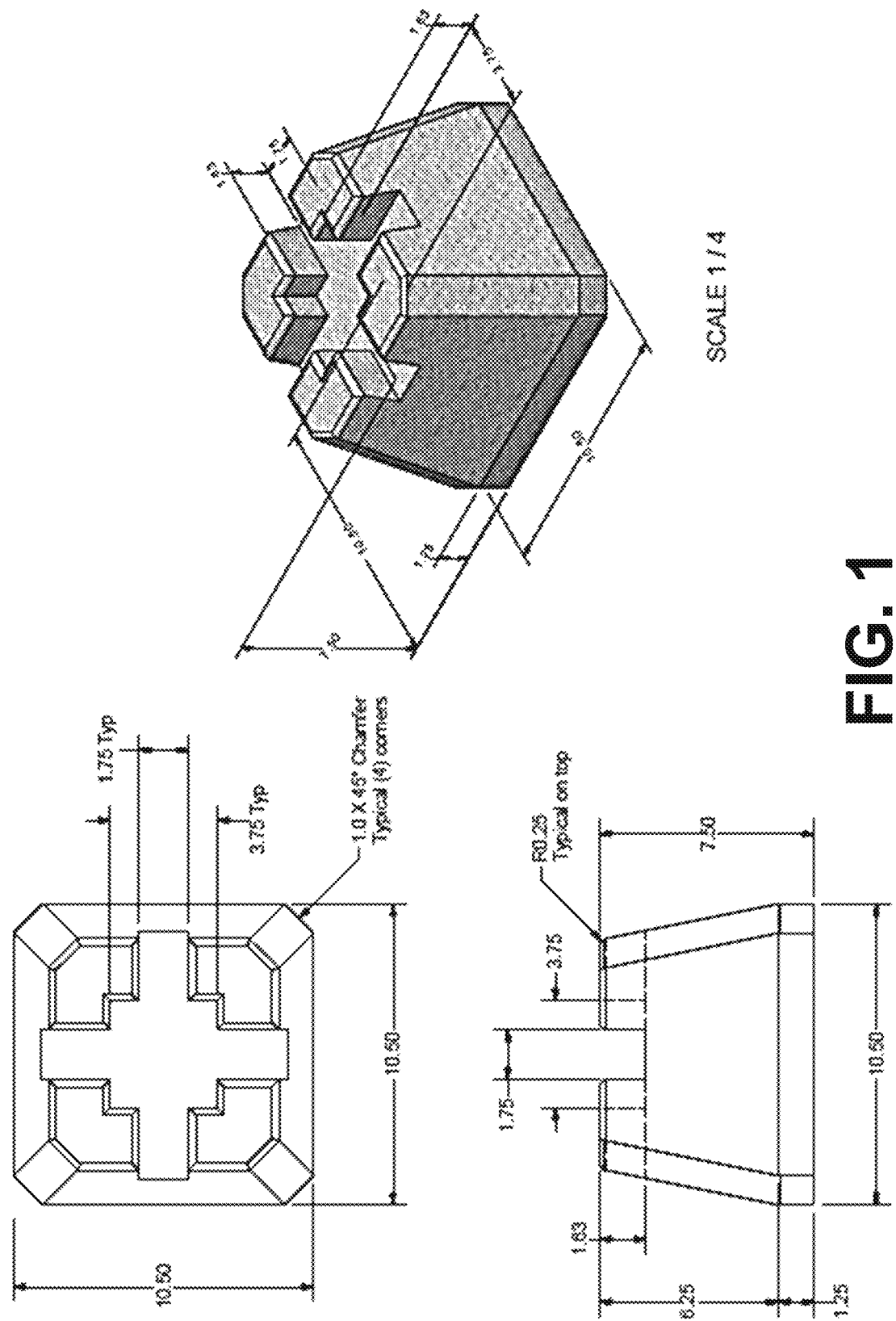
FIG. 1 illustrates an example of a pre-cast concrete support block.

In the following detailed description, reference is made to the accompanying drawings, which form a part hereof, and within which are shown by way of illustration certain embodiments by which the subject matter of this disclosure may be practiced. It is to be understood that other embodiments may be utilized and structural changes may be made without departing from the scope of the disclosure. In other words, illustrative embodiments and aspects are described below. But it will of course be appreciated that in the development of any such actual embodiment, numerous implementation-specific decisions must be made to achieve specific goals, such as compliance with system-related and business-related constraints, which may vary from one implementation to another. Moreover, it will be appreciated that such development effort might be complex and time-consuming but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Wherever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

Support piers or footings can be fixed in the ground or, in some situations, positioned on the surface. Installation of footings can be labor intensive, and innovations that obviate digging and cement pouring have been introduced. Examples of pre-fabricated footings for deck structures, and other buildings that are fixed on supported—as opposed to being poured concrete foundations structures—include concrete piers or footings buried in the soil, helical piers screwed into the ground, or other types of preset foundation support.

In recent years, floating decks have become popular, especially in areas where the grade is level. Freestanding decks and structures are referred to as "floating" because they rest on the surface of the grade and have a range of motion that does not cause damage or failure of the deck or structure. Structurally, floating decks comprise three elements: the footing and its relative holding power in or on the soil, the post joist connecting to the foundation, and the floor structure overlaying the post joist.

A variation of a floating deck is a floating foundation structure. These can be used in the construction of "tiny houses," mobile home support, temporary housing, storage buildings, etc. Such smaller buildings can be more quickly constructed using this type of foundation, at least because a concrete foundation need not be poured and allowed to cure. Moreover, all of the parts needed to construct these smaller structures can be shipped in a container etc. without concern of whether the necessary quality concrete supply will be present at the site. This means that floating foundations can have utility for rapid deployment military housing or emergency housing, such as is needed in locations where natural disasters have been experienced. Such floating foundation structures can also be used in crawl spaces under floors of existing structures for support or to correct for warping or sagging.

Such floating deck and foundation structures not only reduce the need to set concrete footings or other types of securing devices, they can also reduce damage occurring from ground movement. For example, in a floating deck having a plurality of support blocks as the foundation, when one block is lifted by frost and another is not, posts supported in each block can move independently. This can better ensure that the deck structure will not break due to the forces that are placed on the individual parts.

The most common method to construct a floating deck or foundation structure comprises using a pre-cast concrete block as the footing. These pre-cast concrete support blocks are also known as "deck blocks" and can exhibit a relatively low soil bearing footprint. These are simple in design and concept and are generally shaped like a pyramid but with a flat top, with a cavity formed in the top surface in order to fit either a post or joist, as required in a particular construction application. A top, side and perspective views of a pre-cast concrete support block are shown in FIG. 1. Other configurations for such pre-cast support blocks have been proposed, for example, a "universal" design as disclosed in U.S. Pat. No. 6,345,474, the disclosure of which is hereby incorporated by this reference in its entirety.

Floating decks or foundation structures are easy and fairly low cost to construct relative to more traditional foundation solutions. However, problems do exist with pre-cast concrete deck blocks that have limited the practical utility of the technique. First, the blocks are very heavy. As a result, standard deck blocks are typically constructed at locations fairly close to the point of sale due to their weight and the impact on the logistics of shipment. This leads to considerable inconsistences of strength in these blocks throughout the supply chain, especially since there are no regulations or codes related to the construction and functional aspects of these products. Without confidence that pre-cast concrete blocks will last as long as the intended useful life of the structure upon which the blocks are placed, reputable architects or builders will often refuse to specify this product for use as a deck or floating foundation structure.

Next, there can be considerable breakage of concrete deck blocks prior to use, which causes not only waste, but also supply chain issues. For example, if rapid deployment military housing or emergency disaster housing is intended to be assembled at a remote location from the materials available in a shipping container, the structure will not be buildable if one or more of the pre-cast concrete blocks have broken during transit. If there is no access to ready-mix concrete supply at the location, which will be common especially if the local infrastructure has been disrupted due to natural disasters or at the site of military deployments, the structure cannot be built until intact concrete blocks or a concrete supply can arrive at the site, thus defeating the purpose of sending a structure intended for full assembly to a remote site in the first place.

Pre-cast concrete deck blocks made from conventional concrete also have very little lateral strength given their overall weight and design. Accordingly, if a significant amount of weight is to be supported by the blocks, a large number of blocks will need to be used to generate the necessary foundation structure for the intended use, thus making it exceedingly heavy to transport enough blocks to a location to generate the necessary foundation strength. To gain even the standard amount of strength per each block, the typical concrete curing time must be 28 days prior to use, again making supply chain an issue in that "just in time" manufacture is not a viable option given this extended cure time.

Still further, the concrete nature of prior art deck blocks makes them susceptible to water and ice infiltration over time. Thus, an installed floating deck or foundation made from standard concrete deck blocks may require expensive repair after installation, which may not even be possible in some situations. A floating deck or foundation structure will only be raised to the height of the standard deck blocks. This means that, unlike with a raised deck or foundation structure, at least some of the deck platform will have to be disassembled to affect repairs. For foundation structures, repairs may not be possible without damaging the building or structure situated above. Total failure of the concrete deck block will also likely cause total collapse of the support block. This will mean that a significant shifting of any building or structure above could occur thereby causing considerable damage thereto.

There remains a need for improvements in pre-made concrete support blocks that can be used to support floating decks, floors, or foundation structures. The present disclosure provides this and other benefits.

In significant implementations, the present disclosure relates to support blocks fabricated from polymer concrete. As compared to pre-cast concrete support blocks, for example, as shown in FIG. 1, the polymer concrete-fabricated support blocks are configured to provide improved load bearing capabilities, especially in view of their lightweight and, in some implementations, lower profile configurations vs. prior art concrete support blocks. The disclosed support blocks fabricated from polymer concrete comprise quick set products that can be used shortly after manufacture, can be mass-produced, and are more durable than standard pre-cast concrete blocks.

As used herein, "polymer concrete" is an aggregate mixture that uses a monomeric binder to cure and harden into place. In various formulations, resins that can be used include methacrylate, epoxy resin, furan resins, polyester resin, and vinylester resins. In a specific implementation, the resin used to for the support blocks herein comprises unsaturated polyester resins are the most commonly used.

Unlike standard cement concrete used to fabricate pre-cast concrete support blocks currently in use, the primary hardening (curing) mechanism for polymer concrete is not hydration of a cement binder. Rather, the hardening mechanism is by curing of the monomers in the presence of an aggregate material and, optionally, fillers.

Aggregates and fillers used in the polymer concrete herein can comprise from about 60 to about 90%, or from about 70 to about 80% by volume of a mixture of ingredients. Based on dimensions, aggregates can be coarse aggregates (e.g., comprising material of more than 5 mm size or particles with diameters greater than about 4.75 mm) and/or fine aggregates (e.g., having size less than 5 mm or diameters less than about 4.75 mm). In some implementations, the use of smaller aggregate particles can increase the amount of monomer/resin needed to generate suitable properties for the support blocks. As such, the aggregate particle size should generally be selected to generate a balance between the resulting physical properties and the other aspects of the formulation.

Aggregates used in the fabrication of the polymer concrete support blocks can comprise silicates, recycled polyethylene terephthalate, crushed stone, quartz, gravel, limestone, calcareous, granite, clay, and the like. In some formulations, Portland cement can be used as a primary aggregate material. To improve the environmental profile of the support blocks of the present invention, at least about 5% or 10% or more of the aggregate material can include recycled materials, such as repurposed or recycled concrete.

As would be appreciated, fillers can be incorporated to reduce the void content in aggregate mixture so as to increase the strength of polymer concrete. Different types of fine materials can be used as fillers and they can be, e.g., fly ash, silica fume, phosphor-gypsum, or cinder.

The disclosed polymer concrete can also incorporate fibers in its mechanical properties. For example, one or more of steel, glass, polypropylene, polyester, and nylon fibers can be used. For example, about 5, 10, or 15% fibers, as measured in relation to the total weight of the cement mixture (e.g., cement, water, aggregates, polymer) can be used in some aspects. Fibers generated from recycled fibers can be used. Silane coupling agents can also be used in some implementations to improve adhesion of the fibers to the polymer concrete composition.

By way of explanation, standard strength concrete in use for construction applications is generally brittle in nature and is susceptible to damage during transport or during construction. It is also subject to water infiltration and freeze-thaw performance issues during use. To generate "high-strength concrete," steel (e.g., rebar) and/or fibers can be added to reduce the brittleness and cracking that may result due to construction activity and material expansion in use. Such reinforcement usually adds considerable weight and cost to a finished concrete structure, however. In addition, in order to manufacture concrete in an expeditious manner in order to expedite the standard cure rate, chemical accelerators can be added to hasten the curing process, thus adding cost and complexity to the concrete fabrication. The polymer concrete material used herein is lighter weight at higher strength, while having a faster cure rate than concrete materials in use today.

The polymer concrete used herein can be prepared by mixing the resin with aggregate mixture using known methods. Batch mixing methods can be used in some implementations. Still further, continuous mixing operations can be used. Because curing commences quickly, a mixture of aggregate and monomer should generally be poured into molds substantially immediately after mixing. The amount of resin/monomer used can vary according to the properties desired in the structure prepared from polymer concrete. For example, the amount of resin/monomer can be from about 5 to about 20%, or from about 10 to about 20% of the total weight of a mixture that includes at least one or more aggregate materials and the monomer/resin material and, optionally, fibers.

The polymer concrete support blocks herein can be fabricated using mold boxes that incorporate suitable cavities and/or configurations to impart the various surface and interior features desired by the block in use. As discussed hereinafter, the use of polymer concrete can facilitate the incorporation of additional functional features into the support blocks, such as cut outs, indentations, or the like with more precision.

As would be appreciated, the polymerization reaction can result in adhesion of the polymer concrete to the mold. The various cut-outs and structural features of the support blocks can increase this propensity, especially in regard to the ability to remove the support block from the mold without substantial effort and/or breakage in shorter order. Accordingly, a suitable non-sticking mold material, for example, aluminum can be used. Alternatively, suitable mold release agents can be used. As would be appreciated, the polymer concrete support blocks will be permitted to remain in the mold until it is possible to remove without affecting the structure and intended performance thereof.

The inventor herein has discovered that polymer concrete compositions can, in some implementations, accelerate strength development of the poured composition used to generate the support blocks, thus creating a stronger engineered design matrix of material in a shorter period of time, especially when reinforced with light-weight glass and/or fibers with or without cutouts to further decrease the overall weight of the support block. The shorter curing time, while not providing a fully cured material, can provide a matrix having a decreased friability vs. a support block fabricated from conventional cement material. This can allow the support blocks to be transported for use at an earlier date. In this regard, curing of the polymer concrete blocks have been seen by the inventor herein to generate from about 60 to about 75% of total strength relative to the fully cured block after a curing of one day at room temperature. This is in stark contrast to standard concrete compositions that typically acquire only about 20% of its 28-day strength in one day at room temperature.

The early strength gain can facilitate handling and use of the support blocks herein because this can permit recently made support blocks to resist higher stresses imparted due to mold-stripping, handling, transportation, and erection operations. The full strength of polymer concrete support blocks herein become substantially constant after dry curing for a period of about 7 days. Accordingly, the disclosed support blocks lend themselves to use in construction applications at a much earlier point than with prior art pre-cast concrete support blocks. Accordingly, the polymer concrete support blocks of the present invention are suitable for use in load-bearing applications in less than about 21 days, or less than about 14 days, or less than about 7 days.

The enhanced cure rate for the disclosed polymer concrete support blocks can provide the further benefit of being suitable for assembly line manufacturing, which can be implemented along with continuous mixing operations. Quality control of these parts can be further improved because the quantities of material needed to generate a plurality of support blocks can be generated in small runs, whereas conventional concrete support blocks are generated from a larger quantities of ready-mix concrete. Just-in-time manufacturing processes can therefore be facilitated.

Yet further, the inventor herein has determined that polymer concrete can allow for the manufacture of a much thinner (e.g., "plate-like") material that can be configured into a support block structure, thereby providing higher strengths in cross-section. As shown by the Examples hereinafter, in some implementations, a low-profile spread footing support block can withstand in excess of a quarter million pounds of force load before failing. Still further, test results demonstrate that failure is observed primarily in bending, not crushing as with conventional pre-cast concrete support blocks. In other words, in use, if failure of the polymer concrete support blocks occurs, the entire support block will not crush or fail catastrophically. Accordingly, it is expected that any structure (e.g., deck, building, shipping container, etc.) placed on top of a plurality of disclosed support blocks configured to provide at least part of a foundation structure are substantially more stable and will likely only shift slightly upon failure of one or more of the disclosed support blocks, as opposed to experiencing significant movement of one or more of pre-cast concrete support blocks.

In further aspects, fewer polymer concrete support blocks can be used to obtain the same foundation strength relative to a foundation generated from conventional pre-cast concrete support blocks. For example, at least about 10% or about 15% or about 20% or about 25% up to as much as 50% fewer polymer concrete support blocks can be used to generate the same foundation strength as with conventional pre-cast concrete support blocks. For example, if a foundation requires 10 pre-cast concrete blocks to comply with a specific building code, use of the polymer concrete support blocks herein can allow fewer than 10 blocks to be used.

The disclosed polymer concrete support blocks can be configured to support via engagement with at least some of the support blocks a number of construction elements used to as foundation support for stringers, joists, and wood posts. Yet further, the support blocks can be configured for use with steel posts of a variety of dimensions. For example, the support blocks herein are configurable for engagement with one or more of: a nominal 4 inch by 4 inch wood post, a 4 inch by 4 inch foundation support for a steel post, 4 inch by 4 inch wood joist, a 6 inch by 6 inch wood post, "2 by lumber" (e.g., 2 inch by 12 inch, 2 inch by 10 inch, 2 inch by 6 inch, 2 inch by 4 inch, or 2 inch by 2 inch), specially sized openings for custom or special-purpose foundation structures. When combined as a plurality of support blocks wherein each support block is each, independently, associated with a suitably sized construction element, a foundation structure can be provided for ready use to support a construction feature.

In some implementations, the polymer concrete support blocks can be used to prepare floating decks, that is, a deck structure that is supported substantially by its own weight placed over a plurality of the disclosed support blocks. The polymer concrete support blocks can be used in new construction to provide durable foundation support for buildings or other structures or in remedial/retrofit applications. Floors can also be directly or indirectly supported thereon.

Figure 2A:
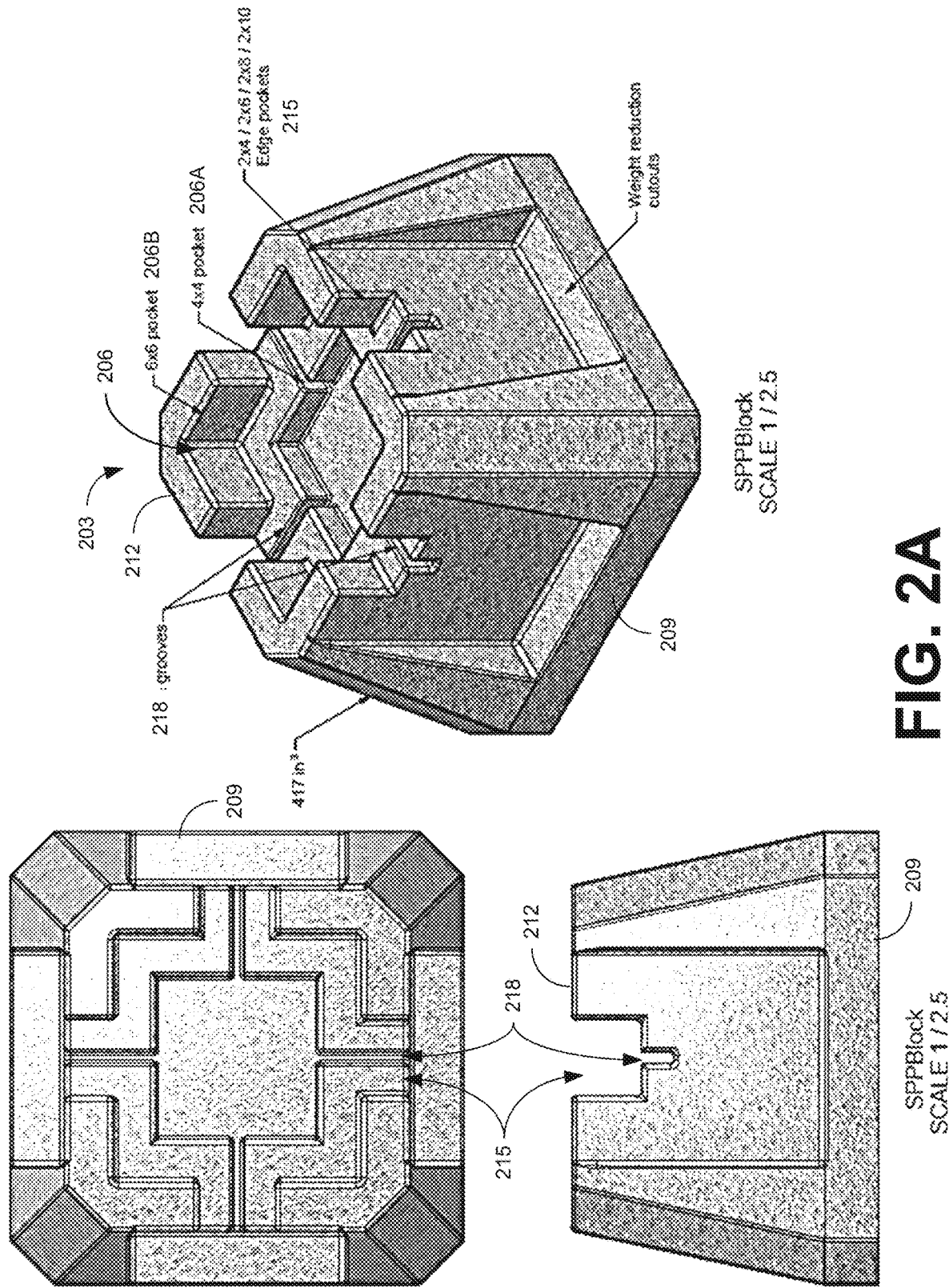
FIGS. 2A-14 and 17 illustrate examples of support block configurations, in accordance with various embodiments of the present disclosure.
Figure 2B:
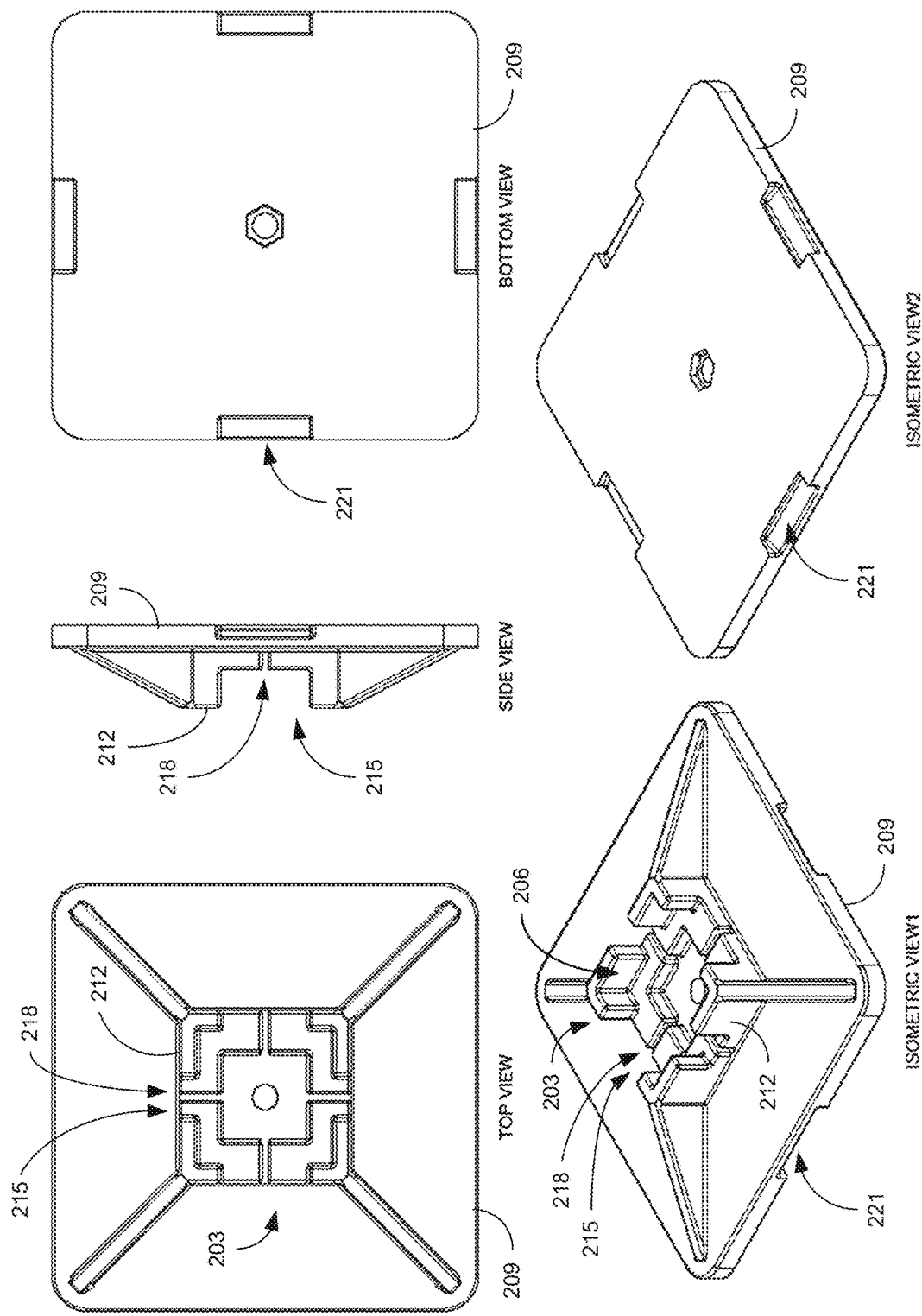
Figure 2C:
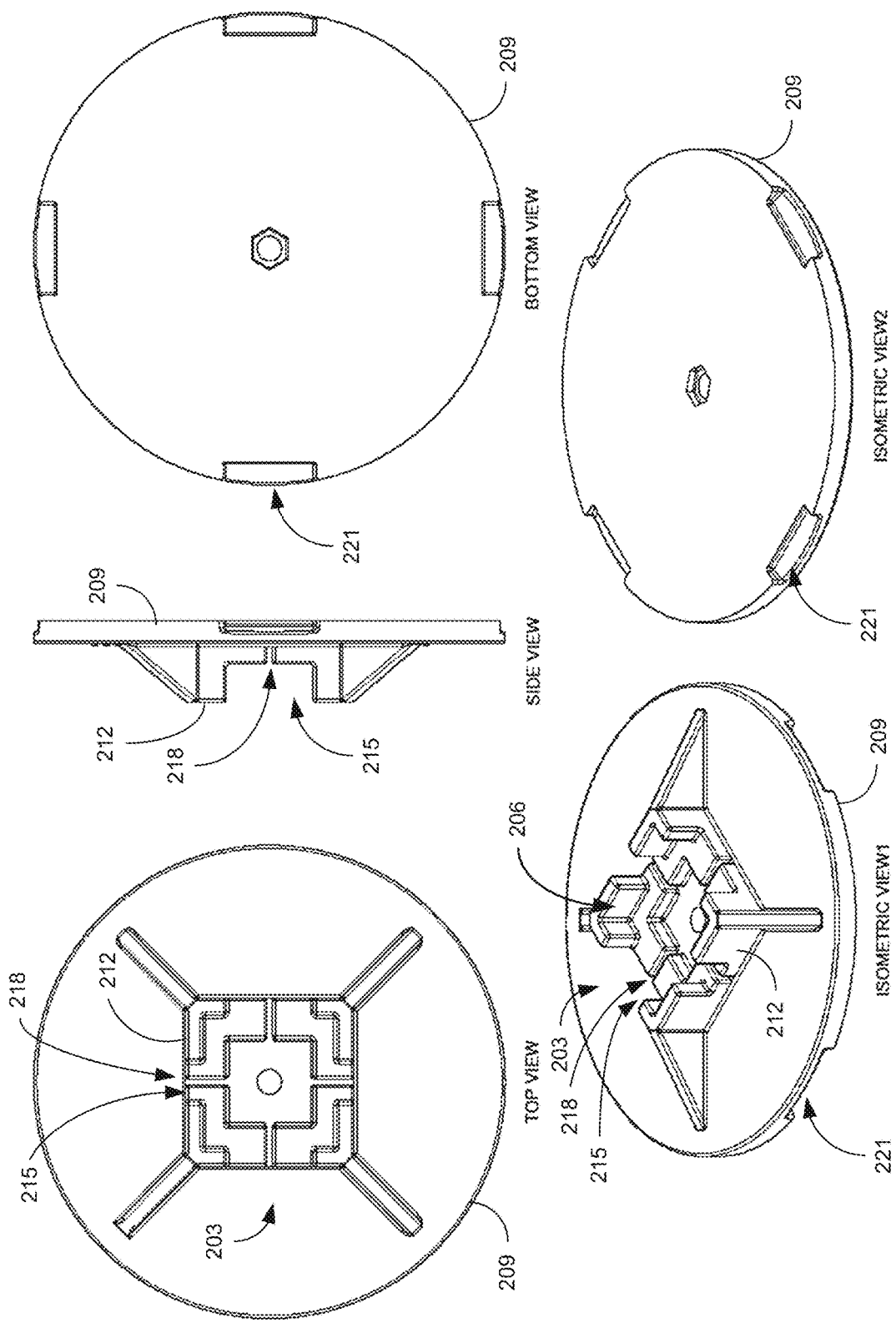
Figure 3A:
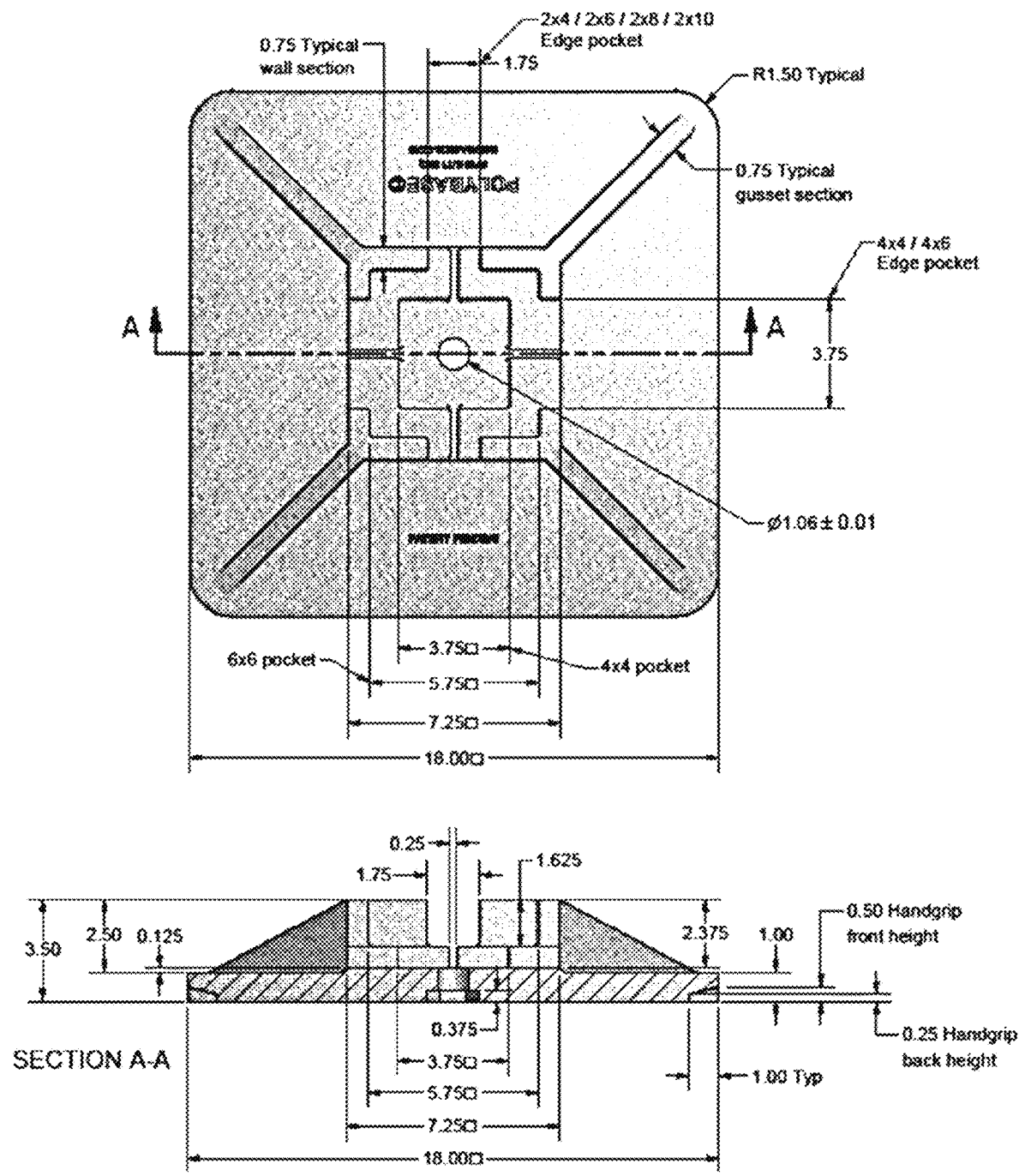
Figure 3B:
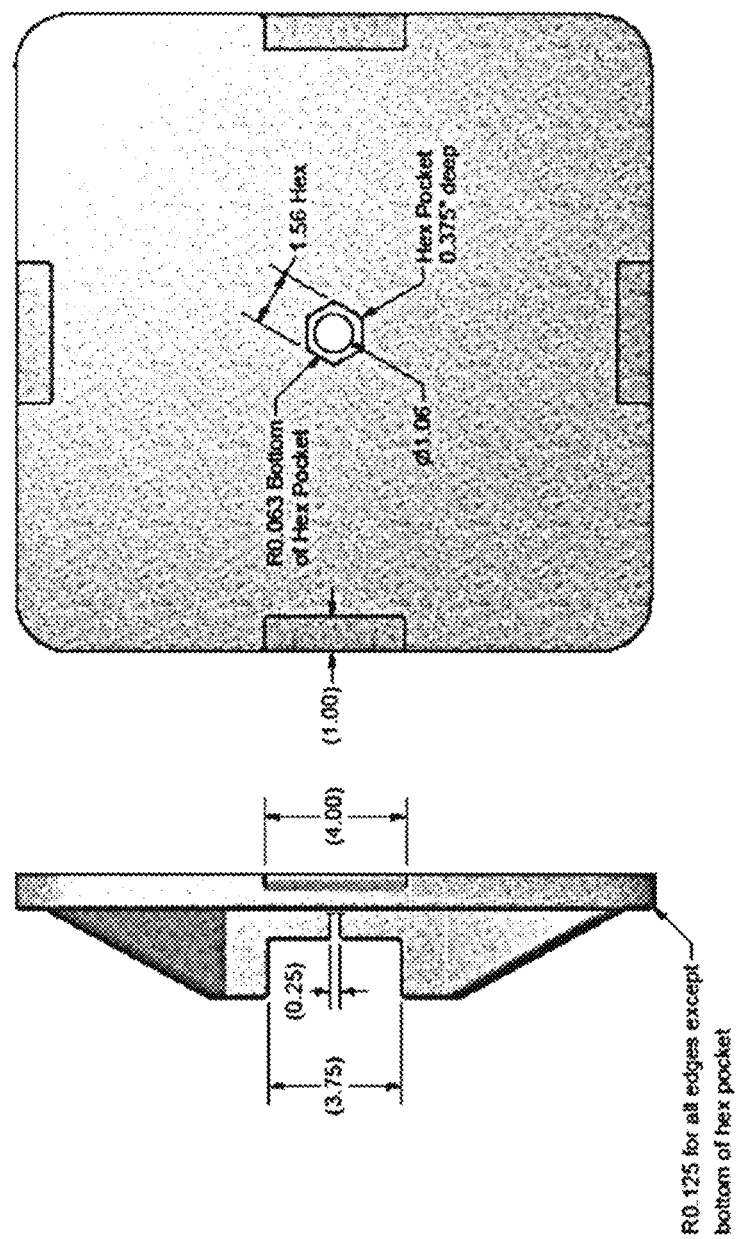
Figure 3C:
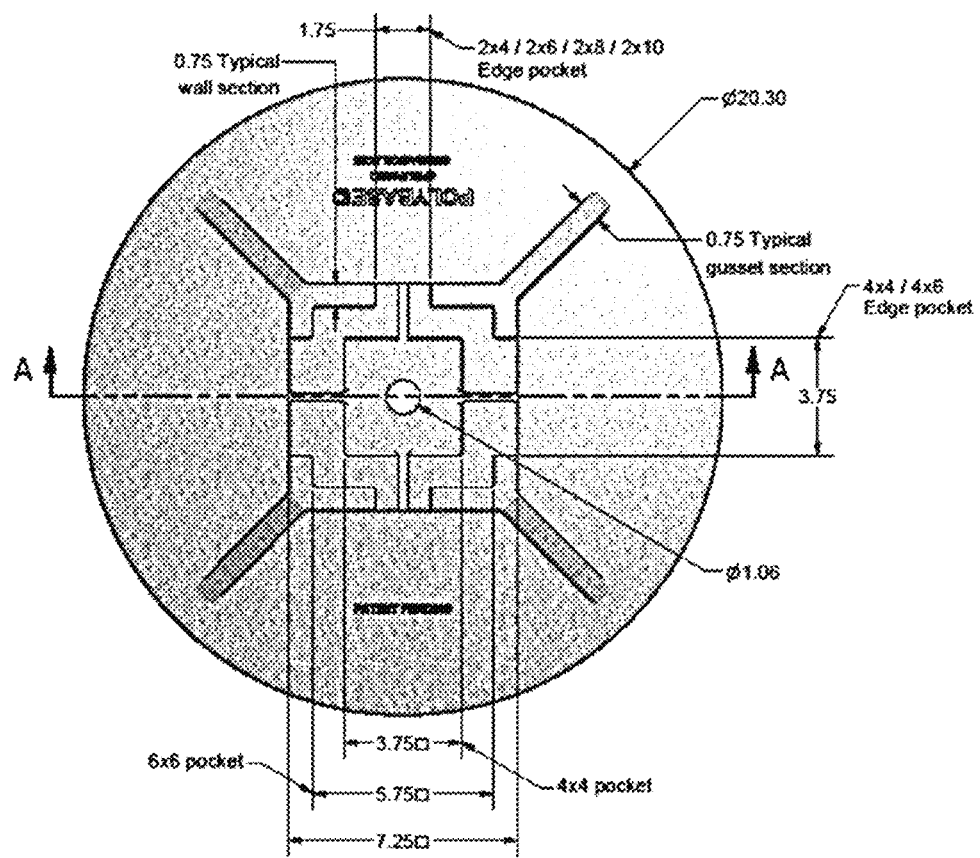
Figure 3C:
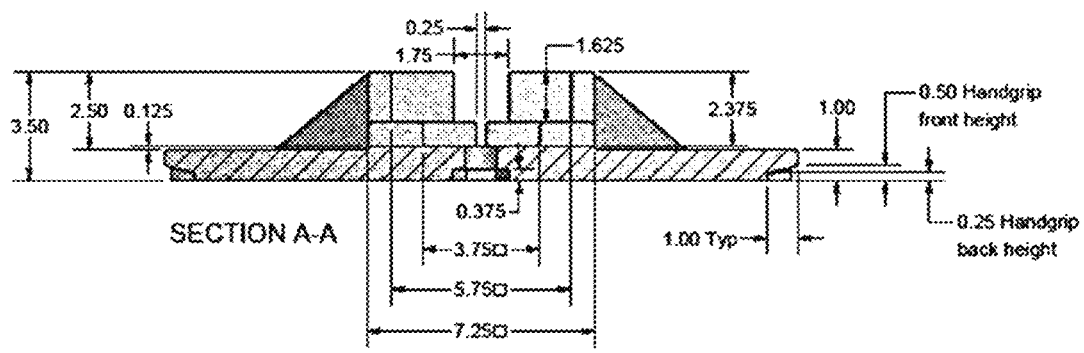
Figure 3D:
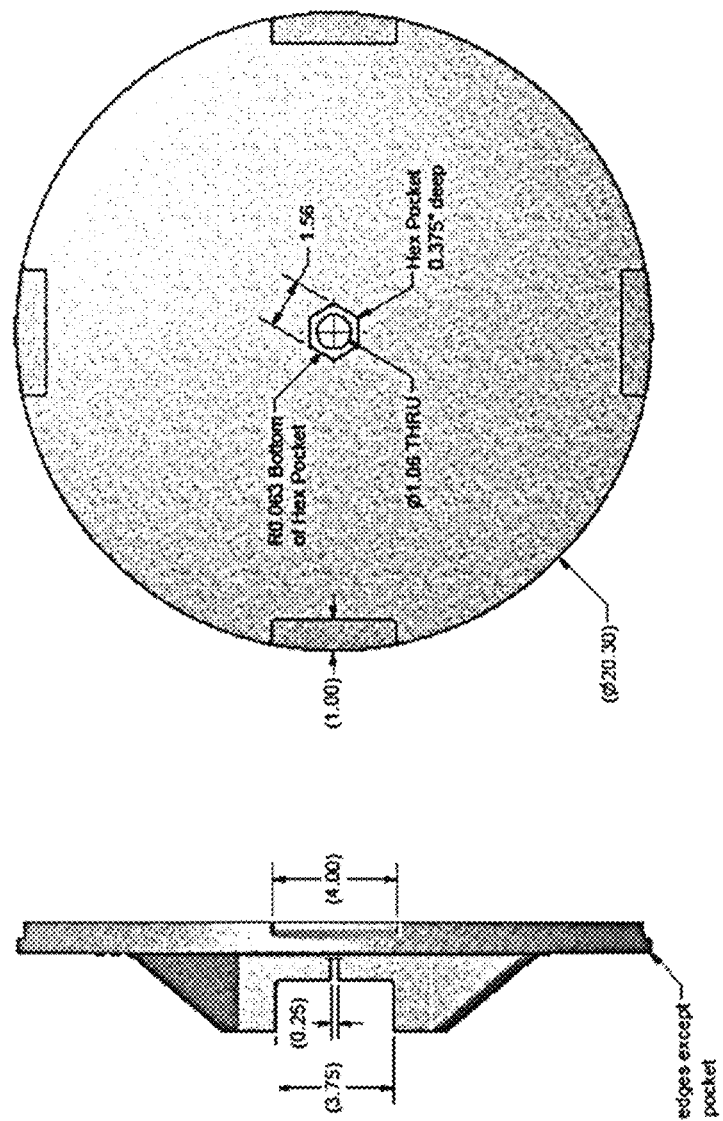

In some aspects, the disclosure comprises a support block fabricated from polymer concrete. In some implementations, the disclosed support block can have dimensions that are substantially equivalent to those of a standard pre-cast concrete support block. Examples of such a support block are shown in FIGS. 2A-2C. In such an implementation, each polymer concrete support block can weigh less than about 40 pounds, or less than about 37 pounds, or less than about 35 pounds. A conventional pre-cast concrete usually has a weight greater than about 45 pounds. Accordingly, the disclosed support block has a weight that is at least about 25 to about 35% less than that of the conventional pre-cast concrete block. Nonetheless, the disclosed block has properties associated with strength and support in the construction context that are significantly improved over the conventional pre-cast concrete block. In other words, the disclosed polymer concrete support block is lighter in weight but yet far exceeds the support and structural properties of the conventional pre-cast concrete support block.

Referring to the implementation of FIG. 2A, an example of the disclosed support block is shown with a construction element support 203 with a 4×4-inch indentation or base pocket 206 (with a cavity) configured for a support base of a post or other suitable construction element of that size on a base plate 209. The base pocket 206 includes a support wall 212 that defines a lower section 206A of the base pocket 206 that is configured to receive and align with an end of a construction element of a first cross-sectional size, and defines an upper section 206B of the base pocket that is configured to receive and align with an end of a construction element of a second cross-sectional size larger than the first size. An example of such base pocket 206 is shown in the outline with the 4×4-inch support section 206A (with a cavity of e.g., about 3.75×3,75-inch). A 6×6-inch pocket section 206B (with a cavity of e.g., about 5.75×5.75-inch) to support a 6×6-inch post is also illustrated. In this case, the cavity of the base pocket 206 is configured for use with construction elements of two different sizes. Edge pocket notches 215 can be included in the support wall 212 about an upper surface of the construction element support 203 to support laterally arranged construction elements. A plurality of alignment (or drainage) grooves 218 can be incorporated into the support block. The alignment grooves 218 are aligned with the edge pocket notches 215 to facilitate alignment of the support block with adjacent support blocks using a laser, snap line or other appropriate alignment tool. By linearly aligning the support blocks using the alignment grooves 218, a laterally arranged construction element (e.g., a joist or stringer) can be installed in the edge pocket notches 215 of multiple support blocks with a minimal effort.

FIGS. 2B and 2C illustrate examples of polymer concrete support blocks with larger base plates to improve load distribution to the supporting surface. For example, enlarging the substantially rectangular (e.g., square with angled or rounded off corners) base plate 209 of the polymer concrete support block, as shown in FIG. 2B, can help distribute load from a construction element installed in the support blocks. These rectangular base plates can have a width of 24 inches. 20 inches, 18 inches, 14 inches, 12 inches or other desired English or metric dimensions as can be appreciated. Yet further, the polymer concrete support blocks of the present disclosure can be in a circular configuration, as shown in FIG. 2C. These circular base plates can have a diameter of 24 inches, 20 inches, 18 inches, 14 inches, 12 inches or other desired English or metric dimensions as can be appreciated. As with the support block illustrated in FIG. 2A, the circular support blocks will have a lower weight than a support block made from standard concrete. Moreover, while it would be expected that a circular block made from standard concrete might be subject to breakage in transit, the additional strength imparted by the use of polymer concrete reduces the friability of the disclosed circular support blocks. Such circular blocks can facilitate transport to tight spaces, at least because the blocks can be rolled to the desired location for use. When the polymer concrete support block includes a base plate 209 that is circular in shape, as shown in FIG. 2C, a centrally located hole extending from the bottom of the base pocket 206 through the base plate can allow a rod or the like to be inserted in a block or between 2 (or more) blocks, to allow the blocks to be more easily maneuvered. While the base plates 209 have been illustrated with rectangular (e.g., square) and circular shapes, other geometric shapes (e.g., hexagonal, octagonal, oval, etc.) can also utilized as can be appreciated.

The support blocks can incorporate one or more cutouts or voids where material can be eliminated to improve the lightweight nature of the support blocks. Due to the enhanced strength features imparted by the use of polymer concrete to fabricate the support blocks according to the disclosure, one or more optional cutouts or voids, when included, have been found to not substantially reduce the load bearing performance of the blocks. To ensure proper strength and to help facilitate distribution of forces through the base plate 209, gussets can extend radially outward from the corners of the construction element support 203. To this end, additional weight reduction can be provided by inclusion of such cutouts between the gussets in some implementations. Gussets can also facilitate drainage of water from the support blocks.

Unlike with pre-cast concrete blocks generated from conventional concrete, the use of polymer concrete can accordingly facilitate the incorporation of functional characteristics in the blocks that can improve the usefulness thereof. In this regard, the polymer concrete support block can further optionally be configured with alignment grooves 218 that provide laser and/or string line points of precision linear alignment on an upper surface thereof to facilitate accurate placement during construction, for example, to generate an accurately placed foundation prepared from a plurality of the disclosed polymer concrete support blocks. Such features are illustrated, for example, as alignment grooves 218 in FIGS. 2A-2C. In these examples, the alignment grooves 218 are centered or substantially centered in a supporting edge of the edge pocket notches 215 located on opposite sides of the base pocket cavity. The alignment grooves 218 are aligned with the corresponding edge pocket notches 215 so that alignment of the grooves 218 in adjacent support blocks with the laser and/or string linearly aligns the edge pocket notches 215 of those support blocks. The polymer concrete support block can further be configured with finger lift pockets 221 (e.g., indentations or cutouts) on a lower surface thereof to facilitate lifting by a worker. The polymer concrete support block can include at least two finger lift pockets 221 around the base plate 209 to create cervices underneath the base plate in order to allow a worker to easily pick up the support block and seat it onto its final resting point. The finger lift pockets 221 can be located on opposite sides of the base plate 209 for even lifting, and can extend radially inward from the edge of the base plate 209 with a taper away from the base plate surface having the construction element support towards the opposite ground contact surface. In this way, the strength of the finger lift pockets 221 changes as the recess depth increases.

Yet further, the polymer concrete support block can be configured with one or more holes extending through the support block having a diameter suitable to allow a bolt to be affixed to a substrate (e.g., subfloor, floor, etc.) or shear stability rod (e.g., a piece of rebar oriented into the ground) to be inserted therein. The hole (or holes) can be of any suitable diameter. In accordance with the increased formability of the support block, the hole(s) can be incorporated during the molding phase. Yet further, the hole(s) can be bored in a finished, that is, substantially cured, polymer concrete support block. In this regard, the inventor has observed that the increased resiliency—and decreased friability—of the polymer concrete-fabricated support block can facilitate the boring of a hole through the block. As shown in FIGS. 2A-2C, a hole can extend from the bottom of the base pocket cavity through the base plate 209. By substantially centering the hole, the stress on the support block can be more evenly distributed. In accordance with this implementation, the disclosure also includes a foundation comprising a plurality of polymer concrete support blocks in which at least some of the blocks comprise a bolt affixed to a substrate or a stability bar affixed in the ground.

Referring to FIGS. 3A-3D, schematic diagrams of top, side and bottom views, of examples of low-profile support blocks are shown. The low-profile configuration of FIGS. 3A and 3B comprises similar features in FIG. 2B, namely, a 4×4-inch pocket (lower section 206A of base pocket cavity 206), a 6×6-inch pocket (upper section 206B of base pocket cavity 206), a plurality of 2-inch and/or 4-inch edge pocket notches 215, a plurality of alignment grooves 218, and optional cutouts or voids such as those shown between gussets. The low-profile configuration of FIGS. 3C and 3D comprises similar features in FIG. 2C, namely, a 4×4-inch pocket (lower section 206A of base pocket cavity 206), a 6×6-inch pocket (upper section 206B of base pocket cavity 206), a plurality of 2-inch and/or 4-inch edge pocket notches 215, a plurality of alignment grooves 218, and optional cutouts or voids such as those shown between gussets. Dimensions shown in FIGS. 3A-3D illustrate examples of fabricated rectangular and/or circular support block dimensions, which can include manufacturing tolerances. When compared to pre-cast concrete deck blocks commonly used, this low-profile design version of the disclosed support block is configured to spread the concentrated load for which the support block serves as a foundation over a greater surface area, thereby providing a greater load bearing capacity, even while the block is stronger and lighter than prior art support blocks. Indeed, the inventor herein has found that the soil beneath the bottom surface of the base plate may lose load bearing capability before the support block itself fails.

By "low profile," it is meant that the height of the polymer concrete support block is about 8 inches or less, or about 6 inches or less, or about 4 inches, or about 4 inches or less, or about 3.5 inches or less, where the inches refer to an average thickness of an outer portion of the base from a top surface to a bottom surface (or the combined height of the construction element support and base plate). As would be appreciated from FIGS. 3A-3D, the lesser thickness of the low profile polymer concrete support blocks can further increase the beneficial properties of the blocks by reducing material costs, shipping costs, and lessening the effort needed by a worker at a job site.

In this regard, testing has revealed that the polymer concrete support blocks of this disclosure fail by bending verses crushing as with standard pre-cast concrete blocks utilized in the industry. By utilizing the low-profile aspect of the disclosure, both considerable cost savings and enhanced functionality can be realized by replacing the time, labor and materials to install a sub-grade foundation currently required by code in much of the US. Based upon test results, it has been ascertained that the soil will fail before the polymer block does.

Figure 4:
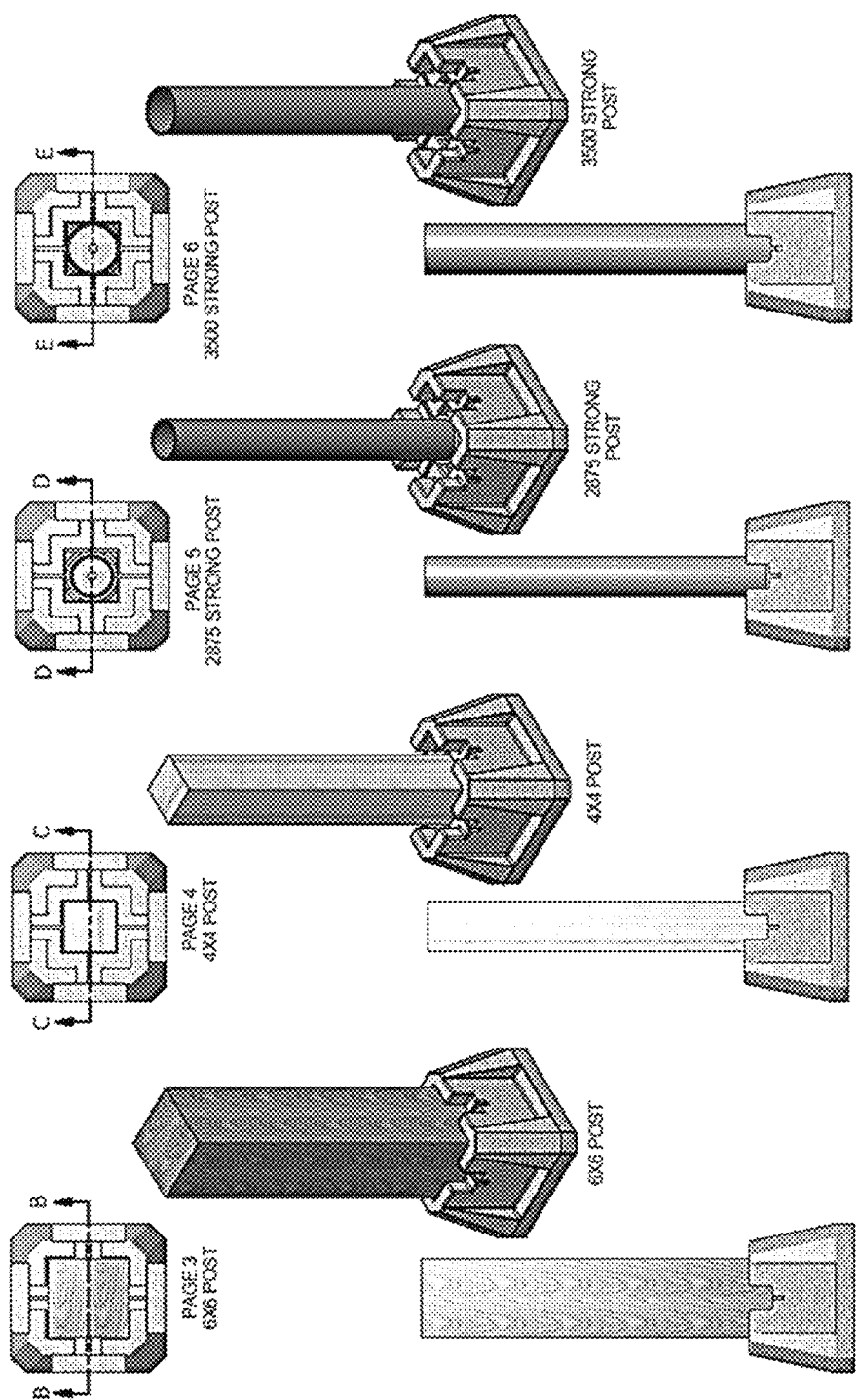
Figure 5:
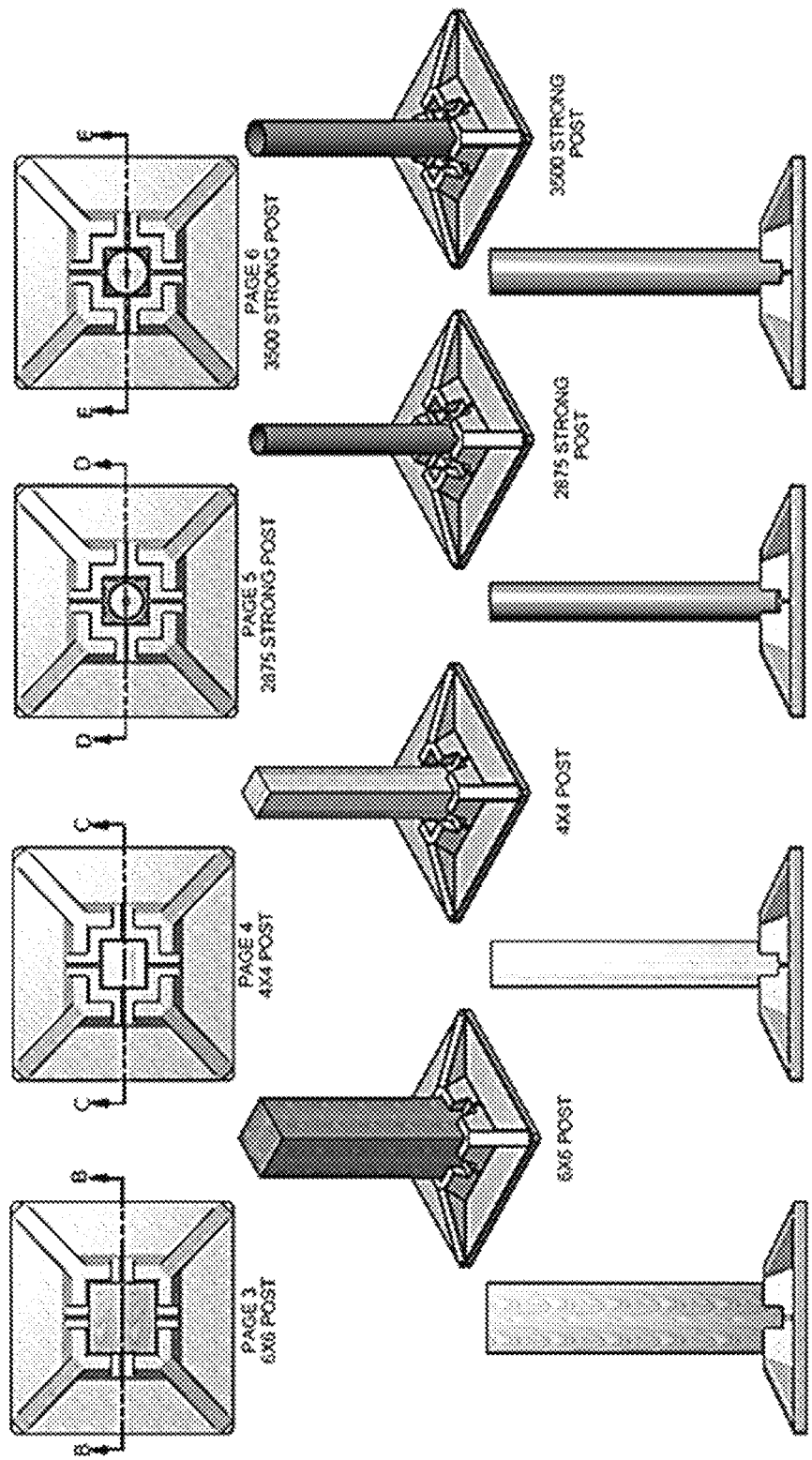

FIG. 4 shows a plurality of configurations for construction elements such as post supports of different sizes that are operationally engaged with the support block of FIG. 2A Shown are top, perspective and side views illustrating engagement of an end of a 6×6 square post that is aligned with the upper section 206B of the base pocket cavity, a 4×4 square post that is aligned with the lower section 206A of the base pocket cavity, and two types of circular posts that are aligned with the lower section 206A of the base pocket cavity. When aligned in the base pocket cavity 206, the construction element extends substantially perpendicular to the planar base plate 209. Yet further, FIG. 5 shows a plurality of configurations for construction elements such as post supports of different sizes that are configured with the support block of FIG. 2B. As in FIG. 4, shown are top, perspective and side views illustrating engagement of an end of a 6×6 square post that is aligned with the upper section 206B of the base pocket cavity, a 4×4 square post that is aligned with the lower section 206A of the base pocket cavity, and two types of circular posts that are aligned with the lower section 206A of the base pocket cavity. When aligned in the base pocket cavity 206, the construction element extends substantially perpendicular to the planar base plate 209. Construction elements can be similarly engaged with the base pocket of the circular support block of FIG. 2C.

The construction element support 203 also includes edge pocket notches 215 having a supporting edge and alignment edges that are configured to align with and constrain an edge of a construction element extending across the base pocket cavity when engaged with the edge pocket notches 215 on opposite sides. When supported by the edge pocket notches 215, the construction element (e.g., a joist or stringer) is substantially parallel with the planar base plate 209. The edge pocket notches 215 aligned in different directions can be sized to support the same width or different widths of construction elements. For example, a first pair of edge pocket notches 215 can be sized for widths of about 2-inches or about 1.75-inches, and a second pair of edge pocket notches 215 can be sized for widths of about 4-inches or about 3.75-inches. Each of the post and block configurations shown in FIGS. 4 and 5, as well as the operational engagement of each configuration and functionality thereof, are considered to be within the scope of the present disclosure.

In various implementations, the polymer concrete support block can comprise a planar base plate and a construction element support on a first side of the base plate. The construction element support can comprise a support wall defining a base pocket cavity that aligns with an end of a construction element that extends substantially perpendicular to the planar base plate; first and second edge pocket notches in the support wall, the first and second edge pocket notches defined by a supporting edge and alignment edges on opposite sides of the supporting edge, the first and second edge pocket notches located on opposite sides of the base pocket cavity and configured to align with and constrain an edge of a construction element extending across the base pocket cavity and substantially parallel with the planar base plate; and first and second alignment grooves aligned on opposite sides of the base pocket cavity for alignment of the first and second edge pocket notches, the first and second alignment grooves extending from the supporting edge of the first and second edge pocket notches to a bottom surface of the base pocket cavity. The base plate and construction element support can be integrally molded of the polymer bonded concrete.

The base pocket cavity can be configured to align with construction elements having first and second cross-sectional sizes, with the first cross-sectional size less than the second cross-sectional size. The support wall can comprise a lower section adjacent to the base plate, with the lower section defining a lower pocket area sized to receive the end of the construction element having the first cross-sectional size, and an upper section defining an upper pocket area sized to receive the end of the end of the construction element having the second cross-sectional size. The lower section adjacent to the base plate can have a first thickness and the upper section has a second thickness less than the first thickness. The lower section can form the supporting edge of the first and second edge pocket notches. The base pocket cavity can have a substantially square cross-section. The construction element that extends substantially perpendicular to the planar base plate can be a square post having a width corresponding to a width of the base pocket cavity or a circular post having a diameter corresponding to the width of the base pocket cavity.

The construction element support can have a substantially square cross-section. The support wall can comprise four portions defining the substantially square cross-section. The first and second edge pocket notches can be centered in opposite portions of the support wall, and the first and second alignment grooves can be centered in the supporting edge of the first and second edge pocket notches. The construction element support can comprise third and fourth edge pocket notches centered in opposite portions of the support wall and substantially perpendicular to the first and second edge pocket notches, and third and fourth alignment grooves centered in a supporting edge of the third and fourth edge pocket notches. A width of the third and fourth edge pocket notches can be less than a width of the first and second edge pocket notches. Gussets can extend radially outward from corners of the construction element support.

The planar base plate can be substantially square, circular, or other appropriate geometric shape. The construction element support can be substantially centered on the planar base plate. The planar base plate can be circular, and a hole can extend from the bottom surface of the base pocket cavity through the center of the planar base plate. The polymer concrete support block can comprise finger lift pockets located on opposite sides of the planar base plate, with the finger lift pockets extending radially inward from an edge of the planar base plate and tapering toward a second side of the base plate opposite the first side. A profile of the planar base plate and construction element support is less than 4 inches.

In a further aspect, the disclosed polymer concrete support blocks exhibit a water absorption rate of less than 1% as per ASTM D570 (2018), which translates to a reading of "virtually impervious." At least in part because of this low water absorption, the disclosed support blocks can remain substantially intact over during the multiple freeze/thaw cycles that will occur during a season and from year to year in colder-climate regions. The alignment grooves or slots 218 shown in FIGS. 2A-2C and 3A-3D assist in facilitating such water resistance improvements. The drainage features are configured to prevent water from becoming entrained in the support block, as occurs frequently with pre-cast concrete deck blocks, as well as facilitating placement during construction, as discussed previously. The alignment grooves 218 can extend to the bottom of the base pocket cavity 206, which can be elevated over the base plate 209 as illustrated in FIGS. 3A-3D. Such drainage configurations can be incorporated into the support blocks substantially coextensively with the locations in which the construction elements are engaged therewith. It is believed that the ability to incorporate smaller sized grooves 218 (offered by this technology among other features) vs. those provided in support blocks made from conventional concrete can result in a more structurally sound block, irrespective of the improvements imparted by use of the polymer concrete as a fabrication material.

Moreover, the polymeric component of the material used to fabricate the disclosed support blocks are also believed to help the water properties of the present disclosure, at least because water is believed to be repelled by the polymeric component. To this end, at least some of the composition from which the disclosed support blocks are fabricated comprises a water repellant material. Still further, the support blocks herein are substantially resistant to water infiltration and freeze-thaw deterioration that can be prevalent in conventional concrete. Without being bound by theory, the inventor understands that the polymeric nature of the binder in polymer concrete reduces the ability and/or propensity of water to infiltrate the concrete structure over time. It follows that a lesser water infiltration will result in less (or, in some cases, substantially no) water having permeated the support block. The reduction, or substantial absence, of water being entrained within the support block when the ambient temperature falls below freezing can result in the polymer concrete support blocks exhibiting a reduced, or even substantially eliminated, ability to having entrained water freeze therein.

The disclosed support blocks of this disclosure comprise a number of improved properties vs. pre-cast support blocks fabricated from concrete. For example, the disclosed blocks are more durable and less susceptive to cracking chipping and crumbling. In this regard, the blocks of the disclosure herein are rated as 'impact resistant' in accordance with ASTM D2444 (2017). Such impact resistance is further illustrated in the Examples hereinafter.

Yet further, the polymer concrete support blocks of the present disclosure are substantially corrosion resistant and highly resistant to alkaline and acid materials as per ASTM D543 (2014). Still further, the disclosed support blocks exhibit UV resistance per ASTM G154 (2016).

In contrast to pre-cast blocks made from conventional concrete, the polymer concrete support blocks can be colored during the manufacturing process to provide an aesthetically pleasing look. The disclosed support blocks can incorporate colorant material, such as a dye or pigment, where such colorant material is incorporated in the manufacturing process. For example, durable support block foundations, can be colored in earth tones to blend into the landscape.

The improved strength features of the polymer support blocks allow the load to be supported by a combination of a plurality of support blocks and the associated construction elements (that is, the stringers, joists, posts, etc.) to be spread out over a larger area, thus providing a structurally stable deck or foundation using fewer materials than would be required using conventional pre-cast concrete blocks. Accordingly, fewer of the disclosed support blocks are needed to be used to carry substantially the same load as can be carried by a configuration of the same construction elements with prior art pre-cast concrete blocks.

As noted previously, in some implementations, the support blocks are circular and comprise a hole from an upper side to a lower side through the center thereof. Such round polymer concrete support blocks can suitably be used in the construction of intermediate floor supports beneath residential or commercial structures built on crawl spaces or basements. Such precast foundations can allow the circular base plate of the support block to be rolled into or underneath the floor structure that needs to be supported and placed on the subgrade beneath the area to be raised. An adjustable support system (e.g., an adjustable post) can be incorporated on an upper surface of the support block and positioned in place to provide support to the floor structure above. Once a load is applied to such floor joist support, an inverse resultant load from the floor structure is transferred by way of the adjusted post on onto the support block. A load from the floor structure can therefore be suitably transferred to and throughout the surface upon which the support block is configured.

The foundation system of the present disclosure can have utility in a number of construction applications including, "tiny houses," emergency structures, rapid deployment military structures, mobile home foundations, sheds, porch decks, shipping containers, and specialty trailer supports. The present disclosure therefore further comprises a foundation or support system for a building structure comprises a plurality of polymer concrete support blocks configurable with a plurality of construction elements, such as a wood, metal, or composite material stringers or joists.

In some implementations; the polymer concrete support block or foundation systems can be used to substitute for the requirement for preparation of a foundation comprised of rock stabilization, pouring of a concrete pad or a combination thereof. The foundation system of the present disclosure is expected to substantially reduce the time, labor and materials to install the sub-grade foundation currently required by building codes in much of the US.

The foundation systems disclosed herein can also be used for emergency response structures. In this regard, the foundation system comprising polymer concrete support blocks can be used to provide easy less costly transportable and deployable configurations of housing or sheltering components; such as containers or modular protective systems. Such components can comprise portable containers and expandable composite panels that can be used to rapidly build floors, walls, and roofs for overhead cover.

The disclosed foundation system can be configured to be secured with soils located on or near the deployment structure(s) to be constructed in order to resist high winds that could affect the stability of the structure during use. This ballast technique can help reduce uncertainty by providing an engineered solution for counteracting high winds when proper superstructure structural elements and connections are utilized. In contrast, conventional pre-cast concrete blocks are contraindicated in areas of high winds.

In some configurations, a ballast floor frame can be integrated with a plurality of the polymer concrete support blocks, for example, the low-profile polymer concrete support blocks of FIGS. 2B-2C and 3A-3D. Such a ballast floor frame can be configured with a high tension fabric suitable to receiving soils having properties to allow use as ballast weight. Such configurations can provide structurally stable foundations for use in difficult areas to access. In one example of such an implementation, the ballast floor frame can be used to create a versatile readiness platform for military applications, as well as for humanitarian housing, among other things. In such applications, locally available soils from sites where the structure is to be constructed can suitably be integrated into the construction plans. In this regard, the local soils can be placed and compacted within a specially fabricated geotextile fabric bladder that can be, in turn, engageably connected to the subfloor frame of a fabricated subfloor framework comprising the disclosed blocks and a plurality of construction elements that are flexibly configurable—that is modular—to support different type of structures. Such foundation systems, and any building structure engageable therewith, can be easily transported as a package to the site. There can therefore be a reduced need to locally source materials to enable the structure to be constructed on site.

As would be recognized, geofabrics (or "geotextiles") are high tensile permeable fabrics that, when used in association with soil, have the ability to separate, filter, reinforce, protect, hold, or drain. Typically made from polypropylene or polyester, geotextile fabrics generally are provided in three basic forms: woven (resembling mail bag sacking), needle punched (resembling felt), or heat bonded (resembling ironed felt). The type of geofabric suitable for use in a particular installation will be significantly influenced by the local terrain. For example, a geofabric suitable for use in a rocky soil may be different than that suitable for sandy or clay soils. The type of geofabric appropriate for use in a specific installation can be appropriately selected by one of ordinary skill in the art. When used in conjunction with the configured foundations comprised of a plurality of polymer concrete support blocks and suitably configured construction elements, the tensioned fabric (that can be covered or partially covered with soil) operates in tandem with the tensioned foundation structure in a counter-weighted arrangement to provide stability and resistance to uplift forces. To enhance this counterweight action, soils can be treated with additives to make them less likely to fly away from the site.

Typical military modular or stick built structures configurable using the disclosed foundation system and associated construction package can be used as medical, troop housing, storage, etc. From a perspective of emergency or humanitarian housing, the disclosed foundation structure can be used to support modular structures or construction techniques common to a local environment. The ballast floor frame work can be affixed to interconnecting block foundations coupled with a high-tension fabric that is capable of receiving variable soils for ballast weight and utilized to provide foundational structural stability in areas of limited remote access, requiring minimal access to equipment and labor utilizing existing soils from a particular existing site as ballast to resist potential uplift loads imposed upon a structure. A high-tensile fabric can be laid onto an earthen surface and localized soils can then be placed upon and connected to the tensional foundational framework of the structure acting as a counter-weight reactive force providing stability and resistance to uplift forces that may affect the superstructure's support and integrity. Treating soils utilized with stabilization ingredients if available may provide additional strength in application. The ballast framework can be compartmentalized accommodating structure utility fit-up.

The foundation system of the present disclosure can also be used as support structures for roofs. For example, heavy equipment or utility or other types of buildings that can be installed on a roof can be supported by the systems of the present disclosure. Yet further, solar installation can suitably be supported. The lighter weight and improved strength of the polymer concrete support blocks of the present disclosure vs. standard pre-cast concrete blocks can better support the overall load placed on a roof when fixtures are placed thereon.

Figure 6:
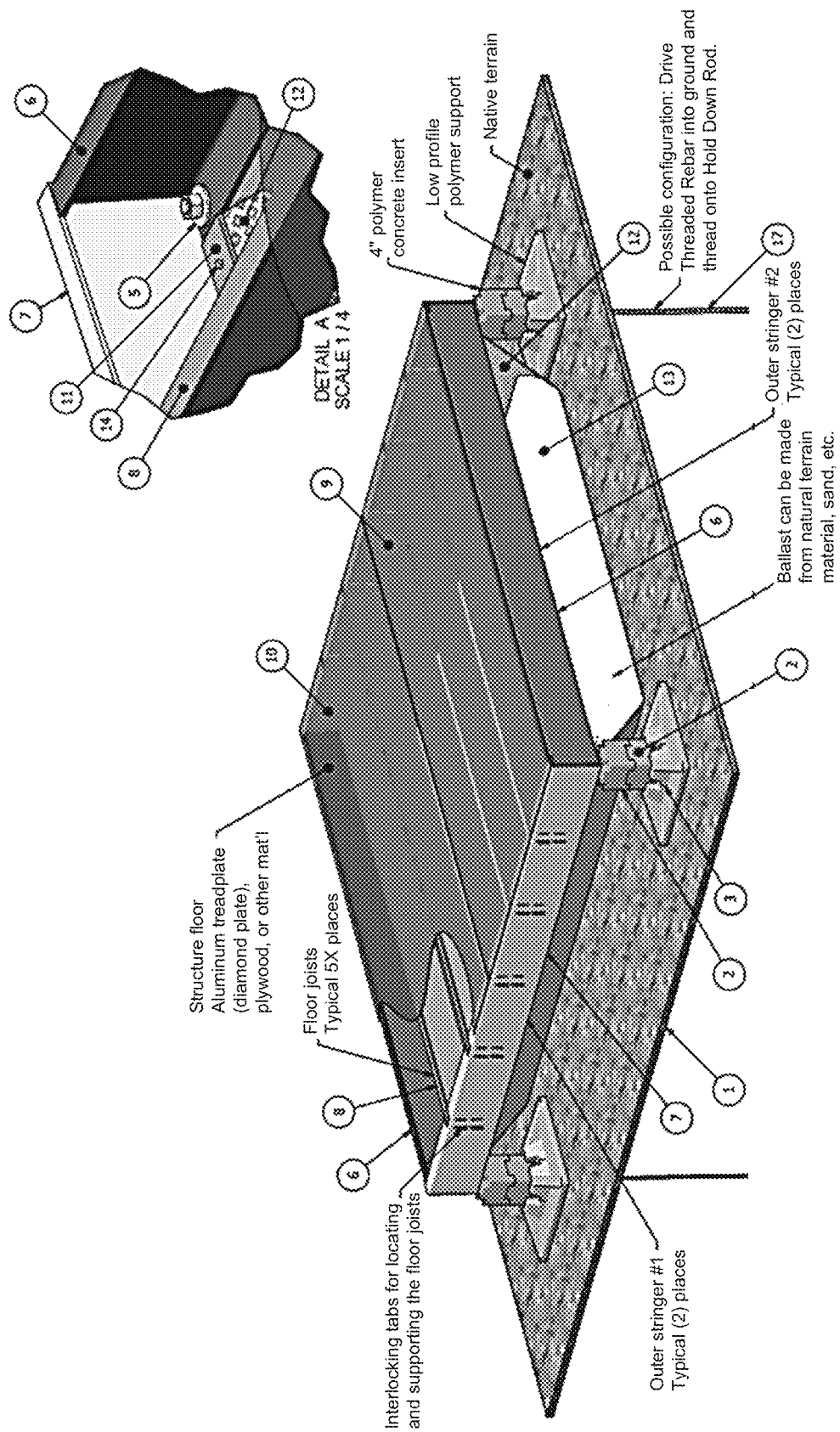
Figure 7:
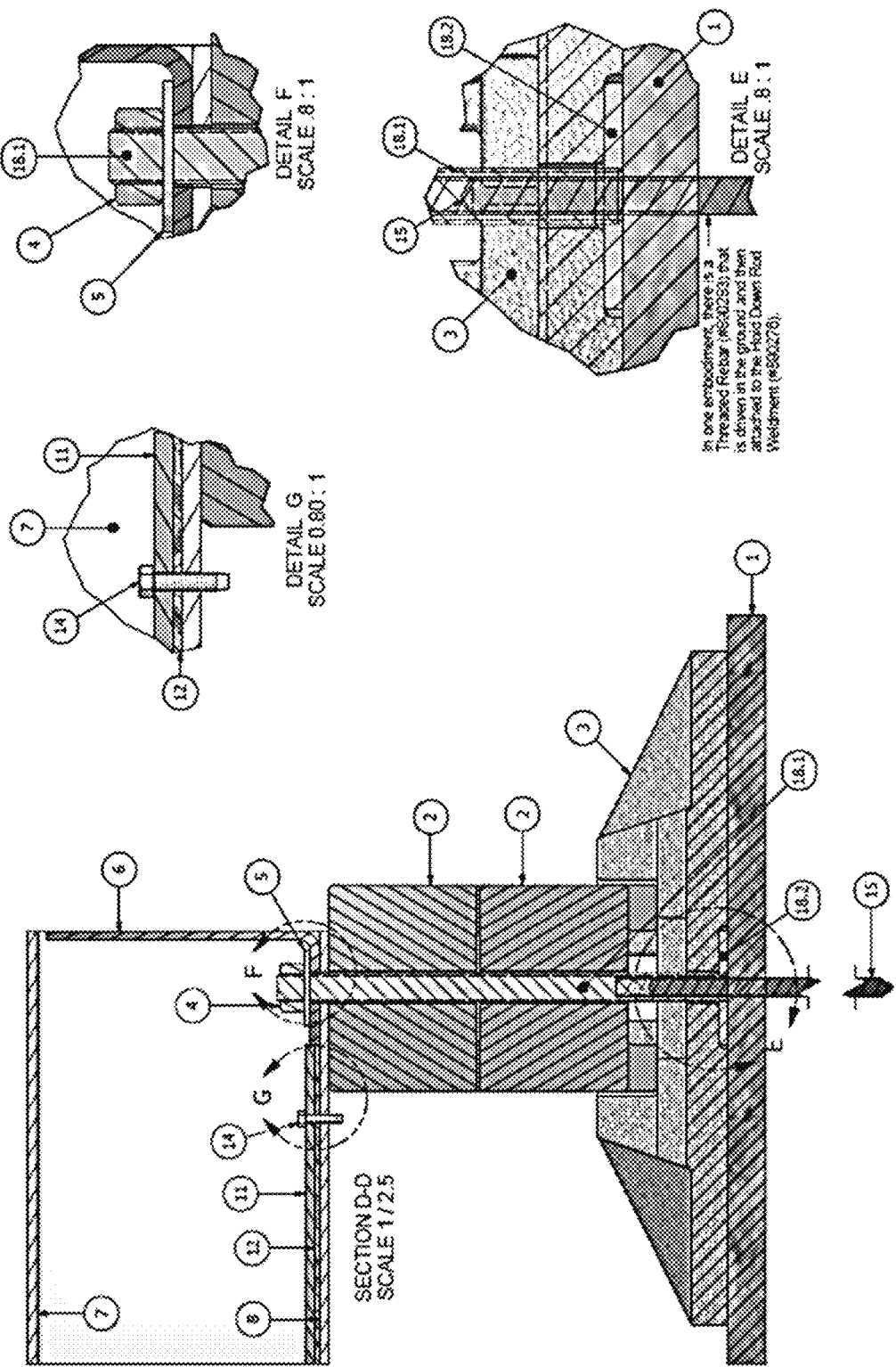
Figure 8:
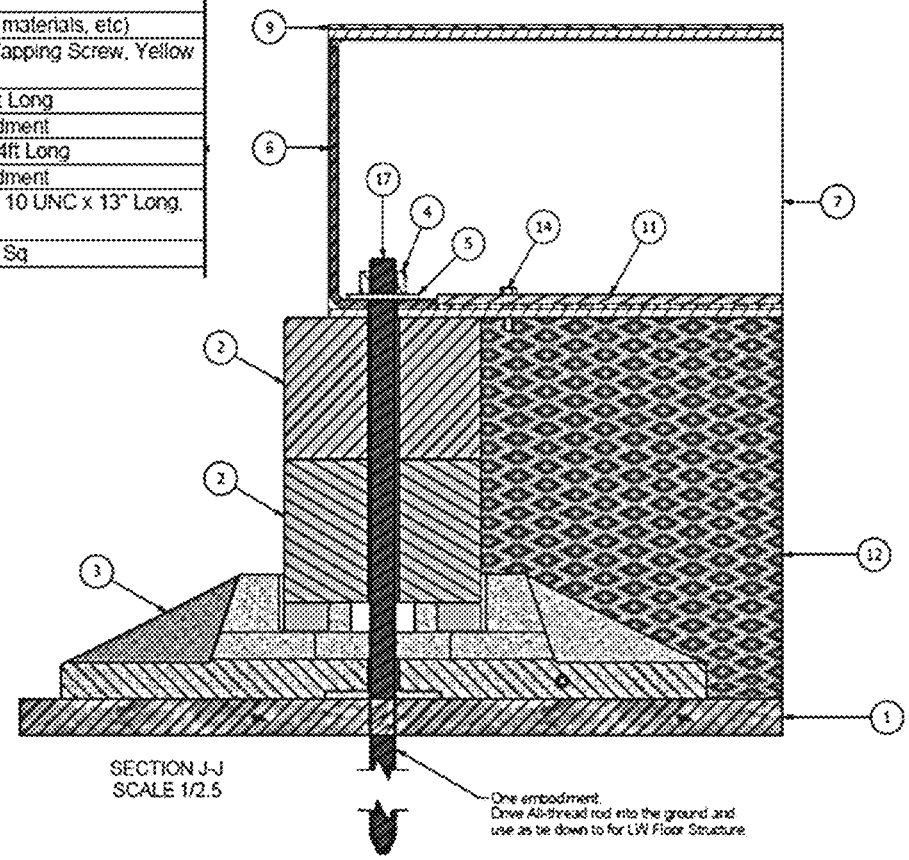

FIGS. 6-8 illustrate an example of a foundation system utilizing the low-profile polymer concrete support blocks of FIGS. 2B-2C and 3A-3D. FIG. 8 includes a key listing item numbers used in FIGS. 6-8. Referring to FIG. 6, shown is an isometric view of a disclosed foundation system having a rigid frame design construction is illustrated. In FIG. 6, the view is of a metal frame (6) is configured having ribs or slats (8) internally mounted to the frame. When fixed in place via mechanical engagement, a rigid frame is provided to provide a component for a foundation system. Such frame is configurable to be mounted onto and engaged with the disclosed polymeric concrete support blocks (3), with the low profile version of FIGS. 3A and 3B being used in this example, to form a strong foundation structure that is capable of spreading a load over a considerably large area of the natural base (1), thereby generating stability for the structure affixed above. Interlocking risers (2) can be used to adjustably elevate the frame over the ground or dirt base (1). The risers (2) can be formed of polymer concrete and comprise notches and tabs for alignment with the polymeric concrete support blocks (3) and other interlocking risers (2). The disclosed support blocks are configurable to receive a support or anchor, here a stabilizer bar (17) in an interior opening contiguous from a top end to a bottom end, which can be used to enhance the stability of the foundation system. Slats or ribs are then placed into the frame and the frame is then ready to receive the subfloor or floor units.

Still referring to FIG. 6, the foundation system is further configurable with a geofabric (12) that can be fixed below the assembled foundation system. The geofabric is generally weighted with a soil material (13) that will be readily available at the site of erection. When properly installed, the geofabric, which can be selected to address local soil types, can enhance the tension load of the overall system. In significant aspects, the disclosed foundation system is suitable for use in high wind environments such as hurricane, tornados, tropical storms, etc.

FIG. 7 is a side view of the low profile polymer concrete support blocks and associated connections. The polymer concrete support block (3) can be placed upon natural terrain (1) and leveled to receive the frame and a stabilizer bar (17) using, e.g., the interlocking risers (2). The stabilizer bar (17) can be driven into the ground through a hole through the low profile polymer concrete support (3). The stabilizer bar (17) can then be capped into the plate or extended even further up to connect into the frame if required. FIG. 8 is an opposing view of FIG. 7 with the addition of the geofabric to enhance the functionality of the disclosed foundation system.

Figure 9:
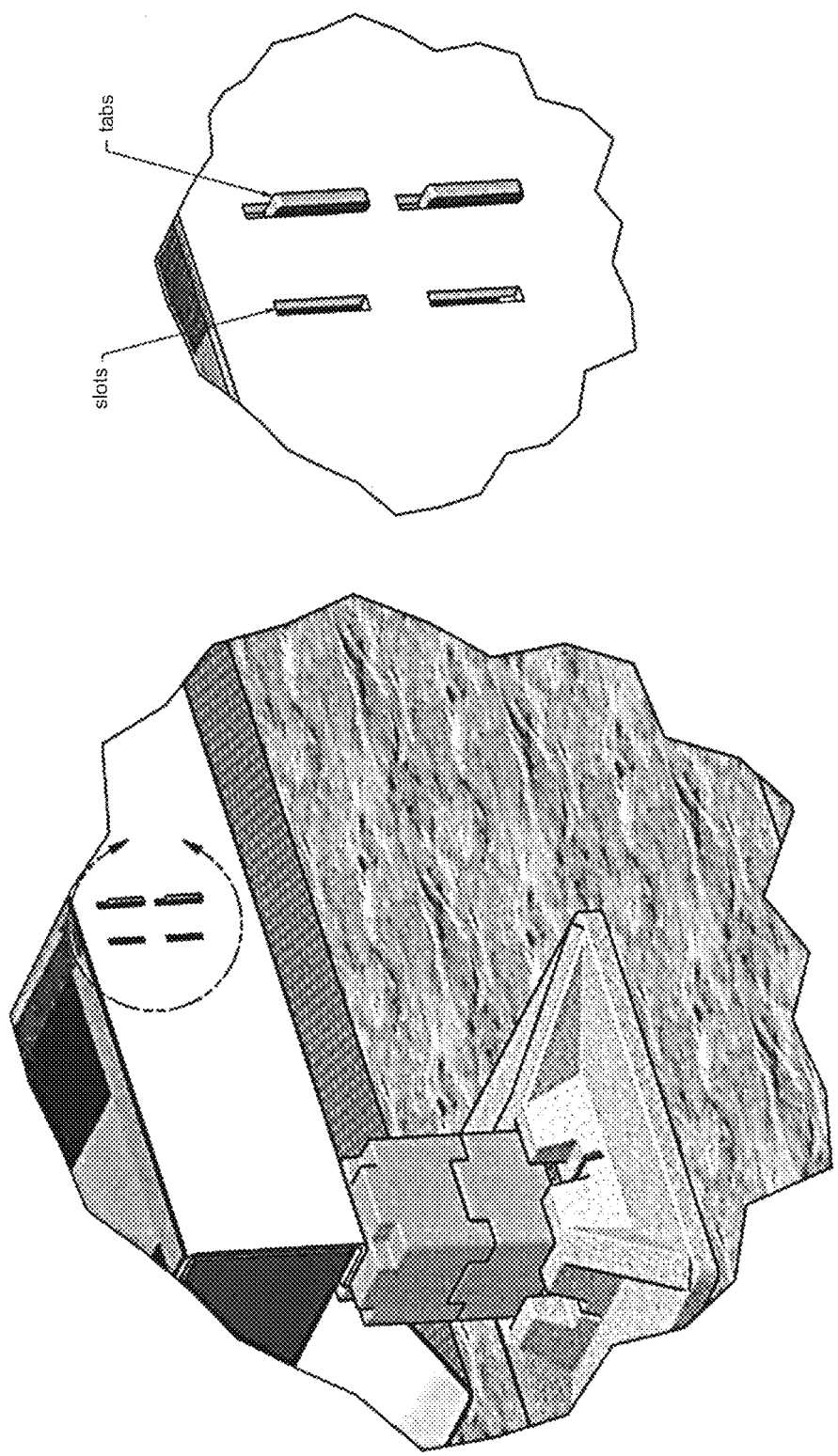
Figure 10:
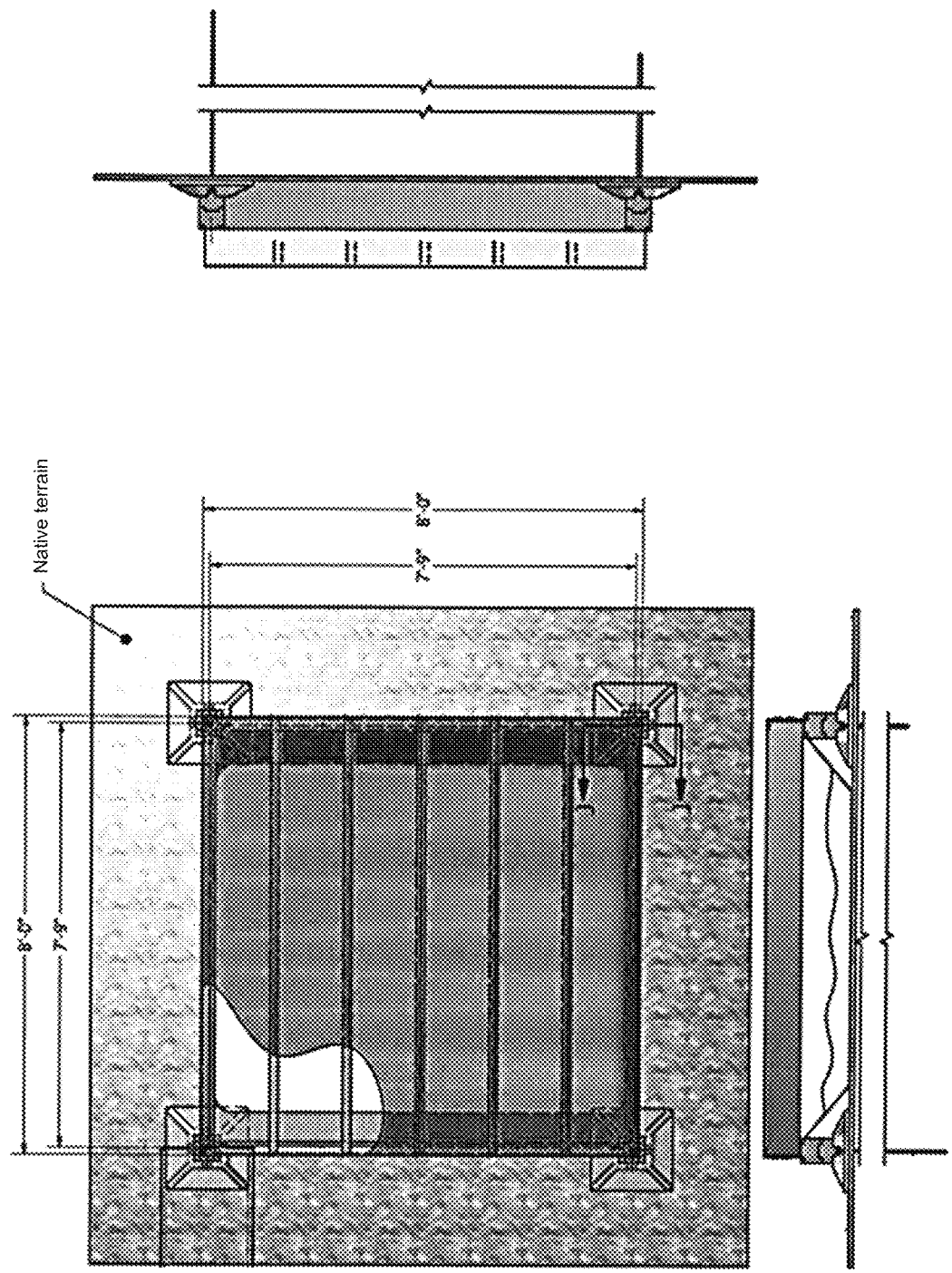
Figure 11:
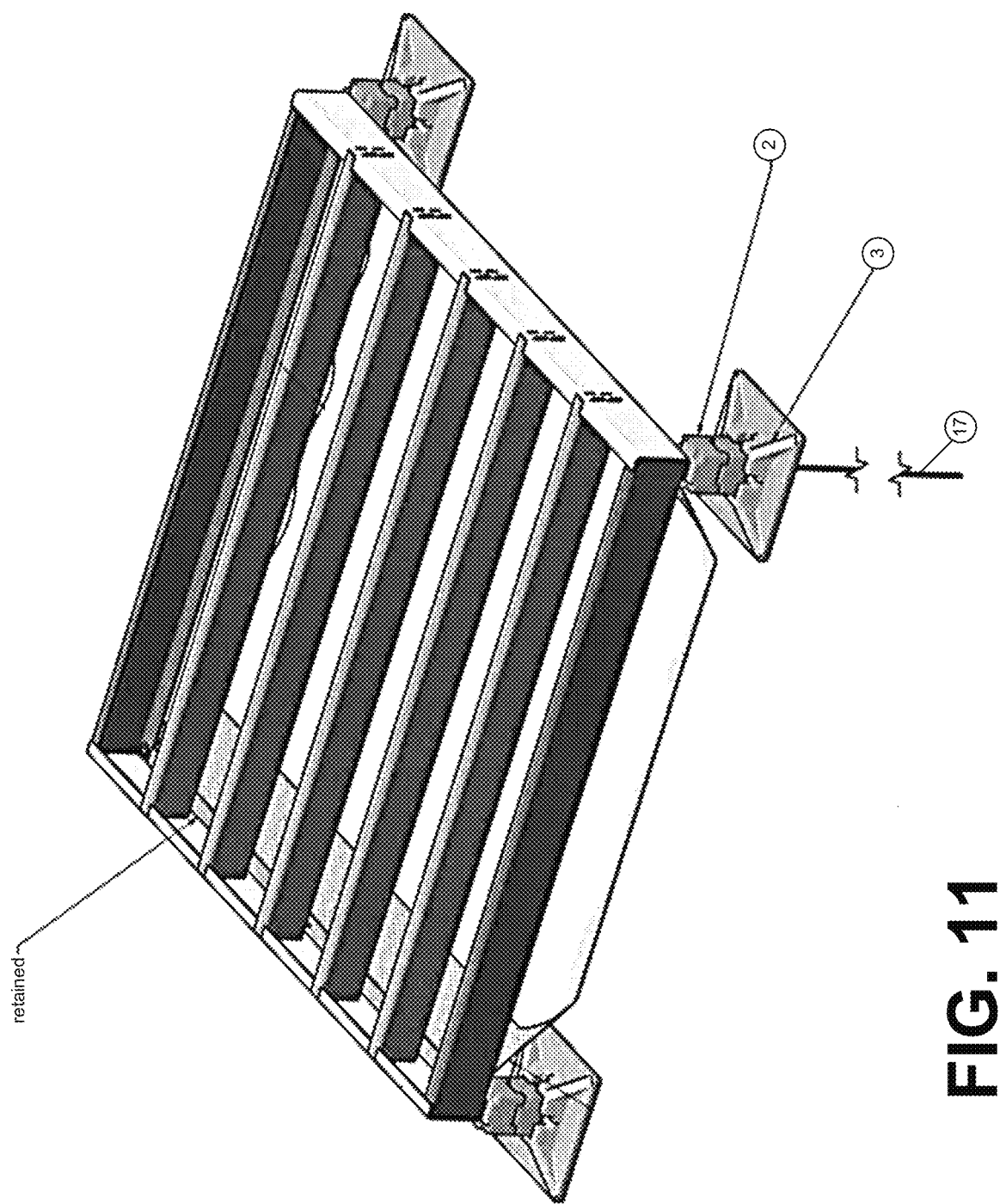
Figure 12:
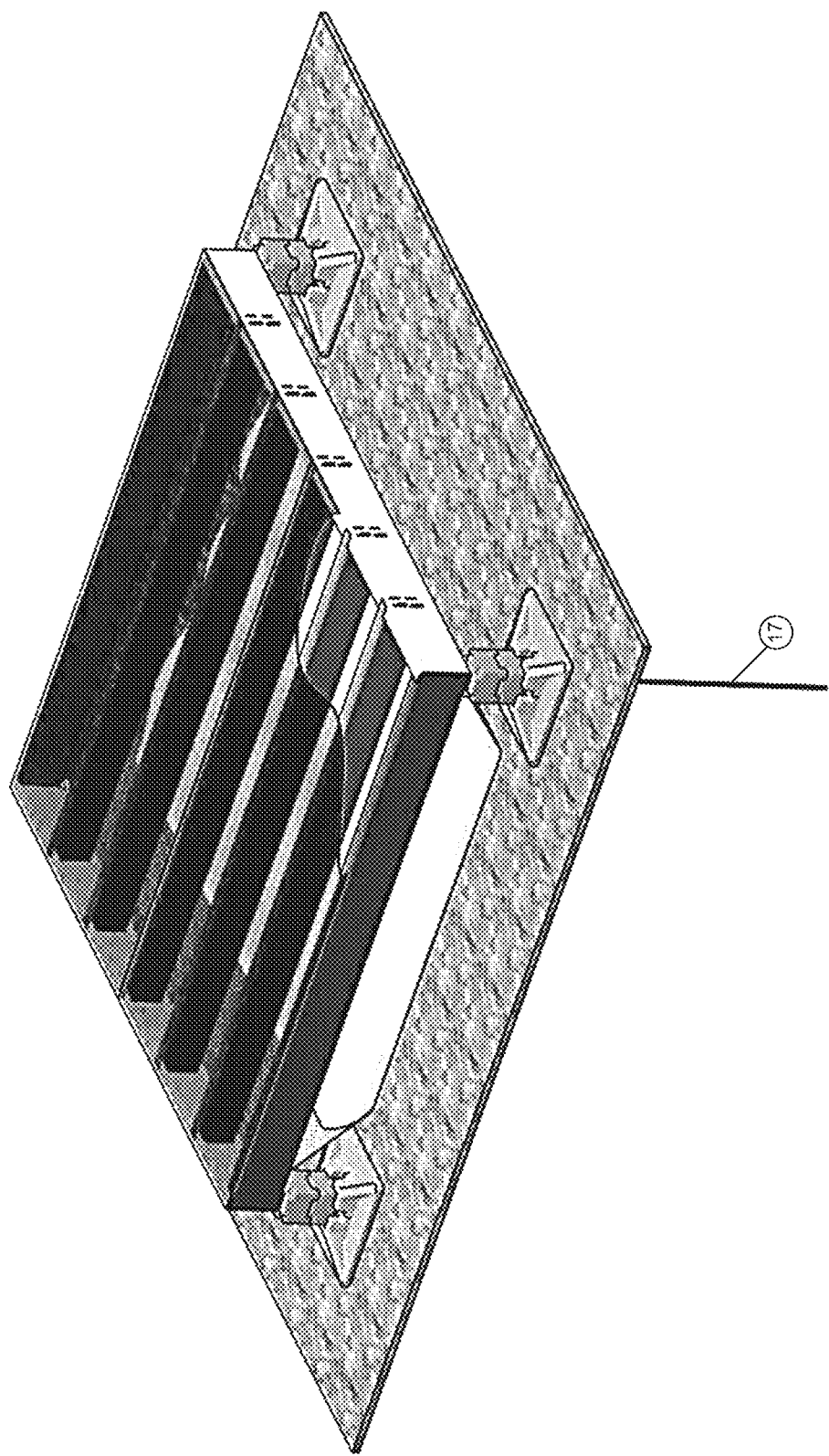

FIG. 9 illustrates an exemplary connection between the metal ribs or slats and the frame of the rigid floor mounting. Tabs can be included in the ends of the joists to align with slots in stringers to facilitate quick assembly with appropriate spacing. FIG. 10 illustrates top, side and end views of an exemplary disclosed foundation system, here a floor, when assembled and prior to the installation of the floor or subfloor. FIG. 11 illustrates an isometric view of the disclosed floor system. FIG. 12 is a cut away view illustrating an opposing view of FIG. 11, with the addition of a floor or subfloor installed thereon.

As would be appreciated, shipping containers are increasingly being used for secondary applications that do not require them to be moved from place to place. For example, shipping containers are being used to create modular housing as well as other structures and even being repurposed for swimming pools. In such secondary applications, the intention is to utilize the container in place, as opposed to its primary application in which it (and its contents) was moved. For such secondary applications, it is necessary to ensure that once they are placed on a surface (e.g., the ground), they will not move during long term use. Such movement could be expected unless the shipping container can be fixed onto a surface.

The inventor herein has determined that the highly strong and durable polymer concrete material can provide benefits to such secondary uses for shipping containers when configured with appropriate fittings to allow the shipping container to be secured for use. Such an application can reduce the propensity of a shipping container to slide or move when placed on a ground surface, and can reduce the amount of materials (e.g., ballast support beams) that may be needed for supporting the container according to prior art methods.

In this regard, the polymer concrete support blocks can be configured during the molding process with connectors and/or inserts to allow a container or other structure having a complementary fitting to be durably secured thereto. Instead of the construction element support features discussed herein being imparted into the mold configuration, the mold can be configured with a top opening suitable to allow a metal fitting element to be inserted into the top portion during the molding process—that is, after the polymer concrete is poured into the mold, but prior to any substantial curing of the material occurs. The planar support base can remain substantially similar when the metal insert is incorporated into the top portion. The metal insert can incorporate a standard configuration suitable for mating with a complementary mating feature. As with the other applications, the polymer concrete blocks fitted with the metal inserts can be further configured to allow for additional securing features, such as holes to allow rebar and or other configurations to fix the polymer concrete block to be secured not just above the ground, but into the ground.

The metal insert incorporated into the polymer concrete block for the implementation described above can be a male fitting that configured to mate with each of one or more complementary hole(s) in a container bottom in a friction fit fashion. The metal insert can also be configured to operate in a "twistlock" fashion such that the female parts of a shipping container (e.g., the corner casting fitted onto the container itself) are arranged as oval holes in the bottom thereof. In fitting to a twistlock container configuration, the top portion (normally pointed to make insertion easier) is rotated 90° so that it cannot be withdrawn. In an example of a standard configuration applicable to a "Conex"-type shipping container, the female part of the connector is the 7×7×4½ in (180×180×110 mm) corner casting, which is fitted to the container itself, and has no moving parts, only one or a plurality of oval holes in the bottom of the container, typically at each of the four corners. In standard form; the hole is an oval 4.9 in (124.5 mm) on the long axis with two flat sides 2.5 in (63.5 mm) apart. The male component is the complementary fit, which is commonly configured as a twistlock, which will be configured as the metal insert that is embedded into the top of the polymer concrete block during the molding process. In use, the male component embedded in the polymer concrete block can be inserted through a complementary container hole when placed in an intended support configuration. Typically, each of the four corners of a container can be supported with each of four polymer concrete blocks that have suitable fittings incorporate therein.

Figure 13:
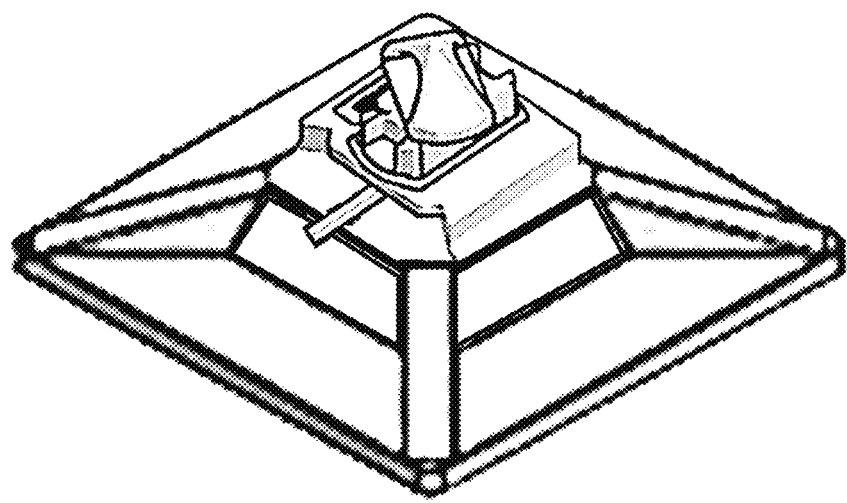

As shown in FIG. 13, the metal element can have a riser tube extending out of a top (or the construction element support) of the polymer concrete block. As would be appreciated, a lower portion (not shown) of the metal insert can be incorporate within the body of the polymer concrete block to add strength thereto. As shown, the metal insert has a twistlock fitting to allow the fitting to be turned approximately 90 degrees when fitted with a complementary fitting in a container, however, a complementary friction fit can be suitable, also.

EXAMPLES

Testing was performed by an AASHTO R18 Army Corp of Engineers accredited independent laboratory in compliance with ANS/ISG/IEC Standard 17025-2005. The purpose was to determine the compressive properties of referenced polymer block foundations. Compressive load testing on the polymer blocks of reference was performed using a 3.5"× 3.5" steel plate as the loading area in order to represent a 4"×4" wooden post that would be used in actual construction. Testing was performed using a Satec-Model 5590-HVL closed-loop, dynamic servo-hydraulic, testing machine conforming to the requirements of ASTM E4-16 Standard Practices for Force Verification of Testing Machines. The rate of loading was 35 psi/sec. which was based on the area of the steel loading plate. Stress values were also determine based on the area of the steel loading plate. Test results are reported in Table 1. Graphs of stress vs. position curves are reported in FIGS. 15 (standard sized) and 18 (wide base).

Figure 14:
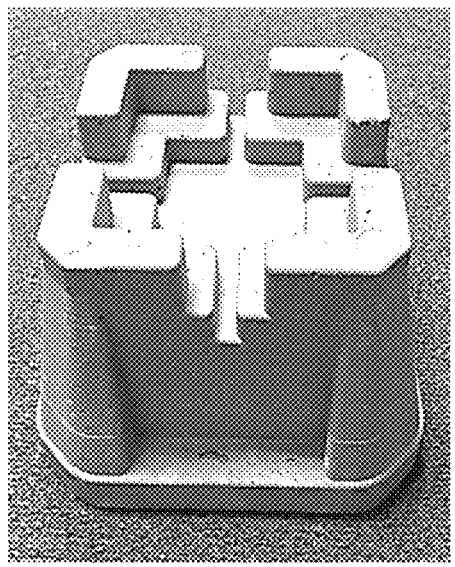

FIG. 14 is a photograph of a polymer concrete support block of FIG. 2A configured substantially in a shape with a pad area similar to a standard pre-cast concrete support block. This support block is configured to provide the same function as a standard pre-cast concrete block yet stronger and lighter than its counterpart. As shown in FIG. 14, some material has been removed, for example cutouts or voids on the sides of the construction element support, to reduce material so as to reduce the weight of the support block, while still providing a functionally superior support block vs. conventional pre-cast concrete support blocks.

Figure 15A:
FIGS. 15A, 15B, 16, 18A, 18B, and 19 illustrate examples of testing results of the support blocks of FIGS. 2A-14 and 17, in accordance with various embodiments of the present disclosure.
Figure 15B:
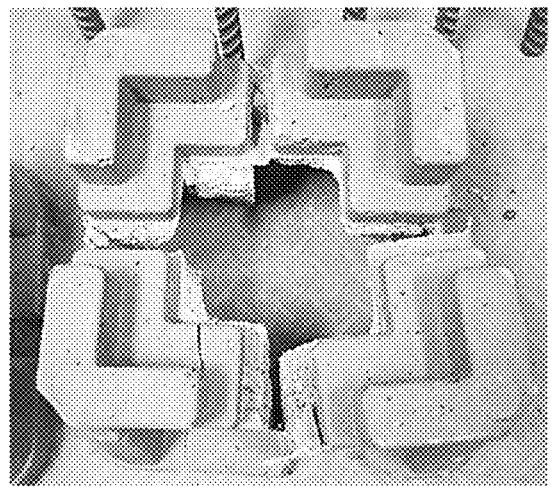
Figure 16:
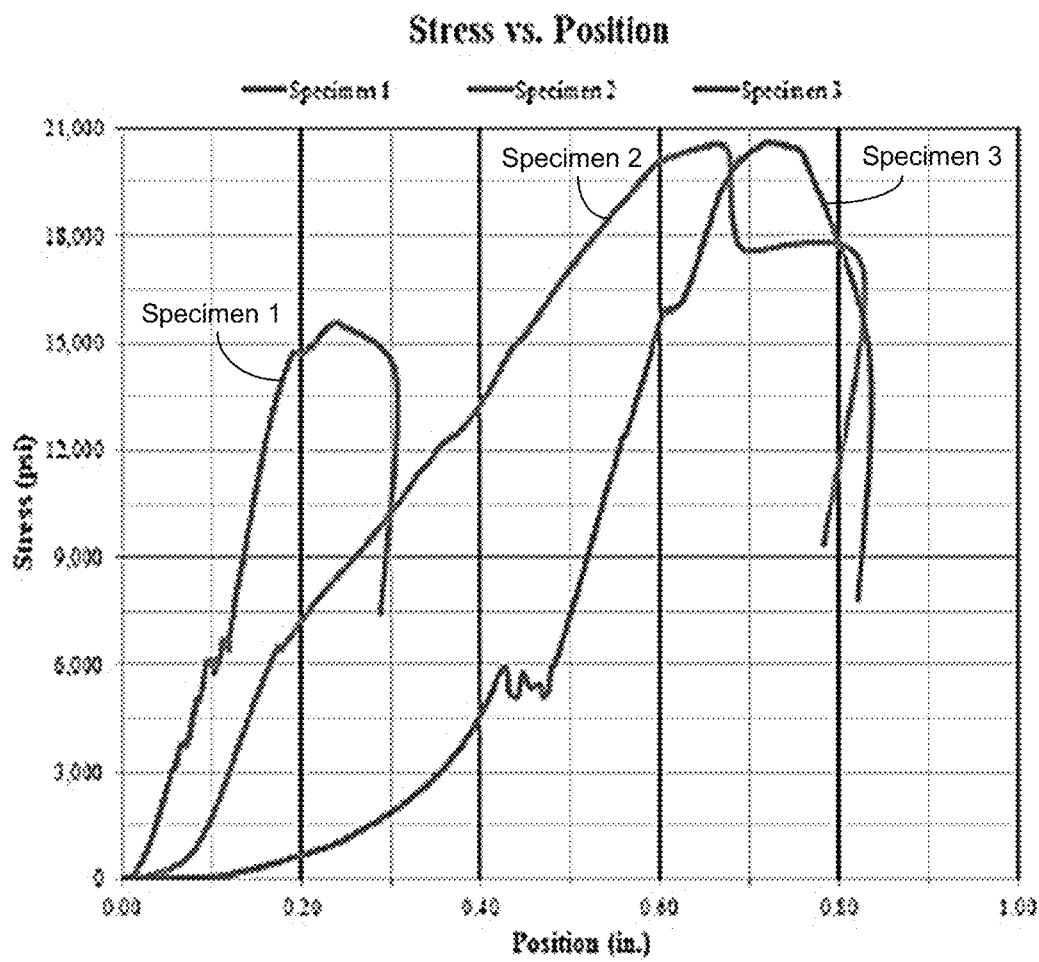

FIGS. 15A and 15B are photographs of two blocks having the configuration of FIG. 14 upon testing the units to failure. Note that the blocks do not crush or disintegrate, as would be expected upon the failure of a pre-cast concrete support block. FIG. 16 is a Stress vs. Position graph showing the results of testing 3 block specimens having the configuration of FIG. 14 to failure. (3 replicates)

Figure 17:
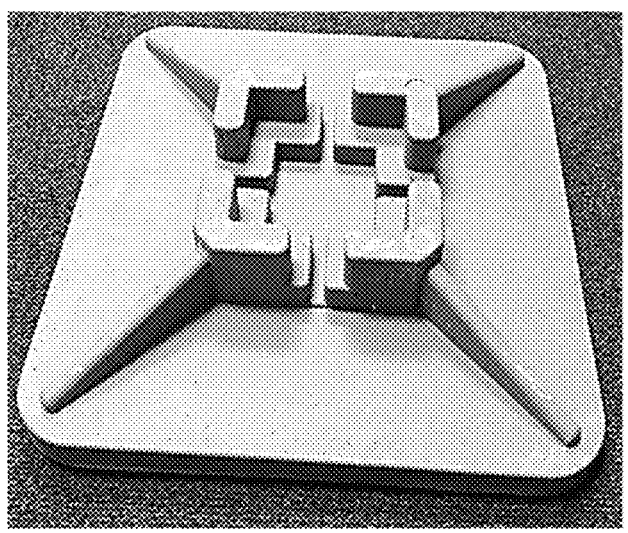
Figure 18A:
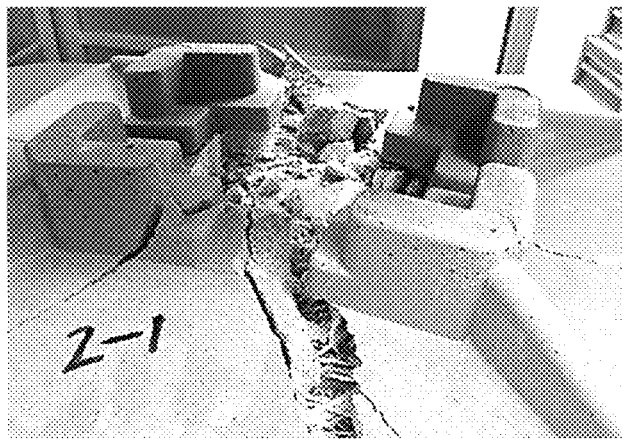
Figure 18B:
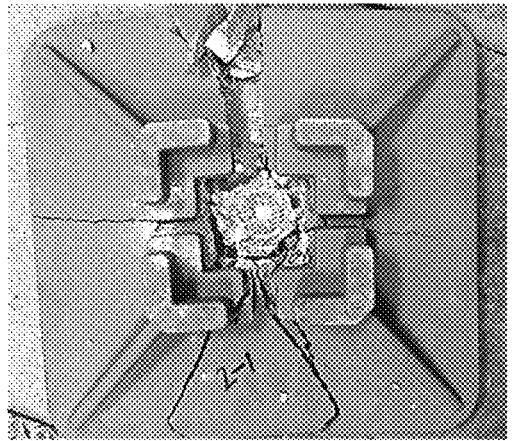
Figure 19:
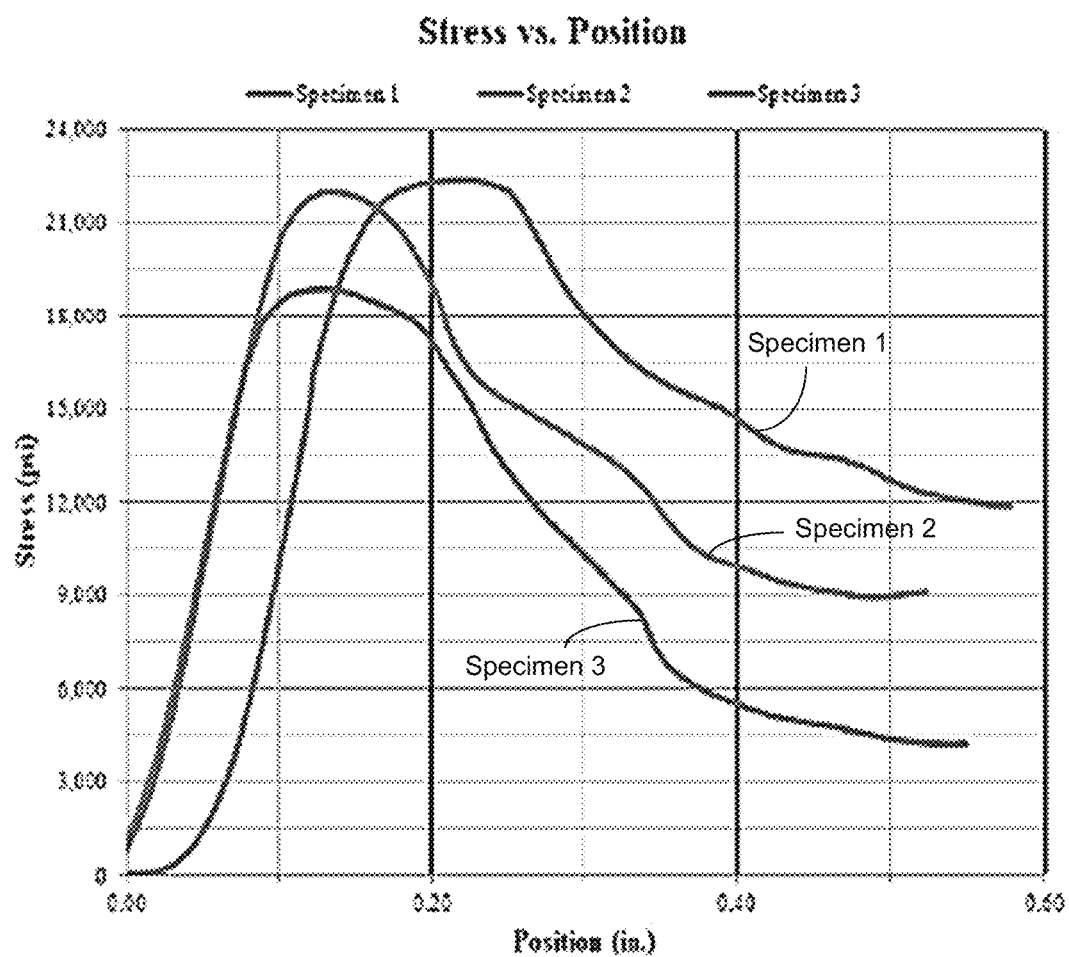

FIG. 17 is a photograph of a low-profile polymer concrete support block of FIG. 2B. FIGS. 18A and 18B are photographs of two support blocks having the configuration of FIG. 16 upon testing the units to failure. Note that the disclosed support blocks do not crush or disintegrate, as would be expected upon the failure of a pre-cast concrete support block. FIG. 19 illustrates a Stress vs. Position graph showing the results of low-profile polymer concrete spread footing block specimens (3 replicates).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Test A

TABLE 1

Compressive Loading Test Results for Standard Sized Support Blocks Phase I Prototype Testing

| Sample ID | Specimen | Yield Load (lbf.) | Peak Load (lbf.) | Yield Stress (psi) | Peak Stress (psi) |
|---|---|---|---|---|---|
| Lowes | 1 | NA | 78,765 | NA | 6,430 |
| (Dry | 2 | | 85,005 | | 6,940 |
| Cast)* | Average | | 81,885 | | 6,680 |
| Home | 1 | NA | 136,759 | NA | 11,160 |
| Depot | 2 | | 133,046 | | 10,860 |
| (Dry Cast)* | Average | | 134,903 | | 11,010 |
| SB Hollow | 1 | 47,39 | 133,763 | 3,870 | 10,920 |
| (polymer | 2 | 94,92 | 148,292 | 7,750 | 12,110 |
| concrete)** | Average | 71,162 | 141,028 | 5,810 | 11,510 |
| SB Solid | 1 | 86,84 | 273,844 | 7,090 | 22,350 |
| (polymer | 2 | 71,55 | 217,979 | 5,840 | 17,790 |
| concrete)** | Average | 79,20 | 245,912 | 6,470 | 20,070 |

*Prior art comparative
**Disclosed

Test B

TABLE II

Compressive Loading Test Results Phase II Prototype Testing

| Sample ID | Specimen | Yield Load (lbf.) | Peak Load (lbf.) | Yield Stress (psi) | Peak Stress (psi) |
|---|---|---|---|---|---|
| SB Solid | 1 | 78,747 | 190,852 | 6,428 | 15,580 |
| (polymer | 2 | 78,899 | 252,070 | 6,441 | 20,580 |
| concrete)** | 3 | 62,358 | 252,499 | 5,090 | 20,610 |

-continued
TABLE II

Compressive Loading Test Results
Phase II Prototype Testing

| Sample ID | Specimen | Yield Load (lbf.) | Peak Load (lbf.) | Yield Stress (psi) | Peak Stress (psi) |
|---|---|---|---|---|---|
| SB Solid-Wide Base (polymer concrete)** | Average | 73,334 | 231,807 | 5,986 | 18,923 |
| | 1 | 119,678 | 274,351 | 9,770 | 22,400 |
| | 2 | 85,522 | 269,479 | 6,981 | 22,000 |
| | 3 | 105,177 | 231,145 | 8,586 | 18,870 |
| | Average | 103,459 | 258,325 | 8,445 | 21,090 |

**Disclosed

What is claimed is:

1. A polymer concrete support block, comprising:
   a. a planar base plate having a first side and a second side; and
   b. a construction element support integral to the first side of the planar base plate and having support walls extending upwardly from the first side of the planar base plate and edge pocket notches at an upper side configured to engage with a construction element in use, wherein the construction element support is substantially centered on the first side of the planar base plate, and wherein the planar base plate extends outward beyond the construction element support,
   wherein the planar base plate and the construction element support are fabricated from polymer concrete prepared from a mixture of monomers, aggregate materials, and fibers.

2. The polymer concrete support block of claim 1, wherein the polymer concrete support block is generated by curing the mixture in a mold configured to generate the planar base plate and the construction element support.

3. The polymer concrete support block of claim 1, wherein at least about 60% of a total strength of the polymer concrete support block is generated in about 48 hours or fewer after start of a curing operation, wherein the curing operation commences when the mixture is incorporated into a mold configured to generate the support block.

4. The polymer concrete support block of claim 1 having a water absorption rate of less than 1% according to ASTM D570 (2018).

5. The polymer concrete support block of claim 1, wherein the support walls surround a base pocket cavity configured to align with an end of at least one construction element.

6. The polymer concrete support block of claim 1, wherein the construction element support comprises:
   a. the edge pocket notches including first and second edge pocket notches in the support walls, the first and second edge pocket notches defined by a supporting edge and alignment edges on opposite sides of the supporting edge, the first and second edge pocket notches located on opposite sides of a base pocket cavity and configured to, in use, align with and constrain an edge of a construction element extending across the base pocket cavity and substantially parallel with the planar base plate; and
   b. first and second alignment grooves aligned on opposite sides of the base pocket cavity for alignment of the first and second edge pocket notches, the first and second alignment grooves extending from the supporting edge of the first and second edge pocket notches to a bottom surface of the base pocket cavity.

7. The polymer concrete support block of claim 6, wherein the first and second edge pocket notches are centered in opposite portions of the support walls, and the first and second alignment grooves are centered in the supporting edge of the first and second edge pocket notches, the first and second alignment grooves having a width of about 0.25 inch.

8. The polymer concrete support block of claim 1, wherein the planar base plate is substantially square.

9. The polymer concrete support block of claim 1, wherein the planar base plate is circular, and a hole extends from the bottom surface of a base pocket cavity through the center of the planar base plate.

10. The polymer concrete support block of claim 1, wherein the construction support element is configured to receive first and second construction elements, wherein the first and second construction elements have different sizes.

11. The polymer concrete support block of claim 1, wherein the support block comprises one or more cutouts in the planar base, thereby providing one or more portions of the planar base having void areas along an outer edge.

12. The polymer concrete support block of claim 1, wherein a profile height of the planar base plate and the construction element support is less than 4 inches.

13. The polymer concrete support block of claim 12, wherein the construction element support comprises third and fourth edge pocket notches centered in opposite support walls and are substantially perpendicular to the first and second edge pocket notches, and third and fourth alignment grooves centered in a supporting edge of the third and fourth edge pocket notches.

14. The polymer concrete support block of claim 1, wherein gussets extend radially outward from corners of the construction element support.

15. A mold configured to generate the polymer concrete support block of claim 1.

16. A method of making a polymer concrete support block, comprising the steps of:
   a. preparing a mixture of monomers, aggregate materials, and fibers;
   b. incorporating the mixture into a mold configured to generate a polymer concrete support block, wherein the generated polymer concrete support block comprises:
      i. a planar base plate having a first side and a second side; and
      ii. a construction element support integral to the first side of the planar base plate and having support walls extending upwardly from the planar base plate first side and notches at an upper side configured to engage with a construction element in use, wherein the construction element support is substantially centered on the planar base plate, and wherein the planar base plate extends outward beyond the construction element support; and
   c. removing the generated polymer concrete support block from the mold when the generated polymer concrete support block is at least partially cured.

17. The method of making the polymer concrete support block of claim 16, wherein at least about 60% of a total strength of the support block is generated in about 48 hours or fewer after start of a curing operation, wherein the curing operation commences when the mixture is incorporated into a mold configured to generate the support block.

18. The method of making the polymer block of claim 16, wherein the fully cured polymer concrete support block has a water absorption rate of less than 1% according to ASTM D570 (2018).

* * * * *

UNITED STATES PATENT AND TRADEMARK OFFICE
CERTIFICATE OF CORRECTION

| | |
|---|---|
| PATENT NO. | : 11,248,390 B1 |
| APPLICATION NO. | : 16/418702 |
| DATED | : February 15, 2022 |
| INVENTOR(S) | : Frank A. Queen |

It is certified that error appears in the above-identified patent and that said Letters Patent is hereby corrected as shown below:

On the Title Page

Item (72), should read:
(72) Inventor: Frank A. Queen, Lawrenceville, GA

Signed and Sealed this
Twenty-sixth Day of April, 2022

Katherine Kelly Vidal
*Director of the United States Patent and Trademark Office*